US012634777B2

(12) United States Patent
Purkayastha et al.

(10) Patent No.: US 12,634,777 B2
(45) Date of Patent: May 19, 2026

(54) SECONDARY CELL GROUP ACTIVATION STATE CONFIGURATION IN MULTIPLE SECONDARY CELL GROUP CONFIGURATIONS

(71) Applicant: QUALCOMM Incorporated, San Diego, CA (US)

(72) Inventors: Punyaslok Purkayastha, San Diego, CA (US); Ozcan Ozturk, San Diego, CA (US); Xipeng Zhu, San Diego, CA (US); Gavin Bernard Horn, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 967 days.

(21) Appl. No.: 17/842,287

(22) Filed: Jun. 16, 2022

(65) Prior Publication Data

US 2023/0413136 A1 Dec. 21, 2023

(51) Int. Cl.
*H04W 36/00* (2009.01)
*H04W 36/08* (2009.01)
(Continued)

(52) U.S. Cl.
CPC ..... *H04W 36/00837* (2018.08); *H04W 36/08* (2013.01); *H04W 36/30* (2013.01); *H04W 74/0833* (2013.01)

(58) Field of Classification Search
CPC ........... H04W 36/00837; H04W 36/08; H04W 36/30; H04W 74/0833; H04W 36/36; H04W 76/15; H04W 36/0069
See application file for complete search history.

(56) References Cited

U.S. PATENT DOCUMENTS

2022/0116840 A1* 4/2022 Purkayastha ......... H04L 1/1896
2022/0338089 A1* 10/2022 Kim ...................... H04W 36/34
(Continued)

FOREIGN PATENT DOCUMENTS

WO 2021158089 A1 8/2021
WO 2021251685 A1 12/2021
(Continued)

OTHER PUBLICATIONS

Ericsson: "UE measurements, mobility and suspend/resume in deactivated SCG", 3GPP TSG-RAN WG2 #116e, R2-2110517, 3rd Generation Partnership Project, Mobile Competence Centre, 650, Route Des Lucioles, F-06921 Sophia-Antipolis Cedex, France vol. RAN WG2, No. Electronic meeting, Nov. 1, 2021-Nov. 12, 2021, Oct. 21, 2021, XP052066963, pp. 1-45.
(Continued)

*Primary Examiner* — Abdullahi E Salad
(74) *Attorney, Agent, or Firm* — Loza & Loza, LLP

(57) ABSTRACT

The user equipment (UE) may evaluate link qualities between the UE and target primary secondary cell group (SCG) cells (PSCells) respectively associated with target secondary nodes, select a target PSCell from the target PSCells based on the link qualities and execution conditions respectively associated with the target PSCells of the target secondary nodes, initiate a conditional execution procedure to connect to a target secondary node corresponding to the selected target PSCell, and responsive to a source SCG state corresponding to a source PSCell of a source secondary node being a deactivated state, perform either: changing an SCG state at the UE to an activated state and performing a random access channel (RACH) procedure on the selected target PSCell to perform the conditional execution procedure to connect to the selected target PSCell, or maintaining
(Continued)

the SCG state at the UE as the deactivated state without performing a RACH procedure.

18 Claims, 14 Drawing Sheets

(51) Int. Cl.

| | | |
|---|---|---|
| *H04W 36/30* | (2009.01) | |
| *H04W 74/08* | (2024.01) | |
| *H04W 74/0833* | (2024.01) | |

(56) References Cited

U.S. PATENT DOCUMENTS

| | | | |
|---|---|---|---|
| 2023/0071268 A1* | 3/2023 | Xu | H04W 76/27 |
| 2023/0308960 A1* | 9/2023 | Selvaganapathy | H04W 36/0058 |
| 2023/0345315 A1* | 10/2023 | Wu | H04W 36/362 |
| 2023/0403646 A1* | 12/2023 | Wallentin | H04W 52/0258 |
| 2024/0032136 A1* | 1/2024 | Zhang | H04W 74/0833 |

FOREIGN PATENT DOCUMENTS

| | | | |
|---|---|---|---|
| WO | 2022086389 A1 | 4/2022 | |
| WO | 2022086419 A2 | 4/2022 | |
| WO | WO 2022/086389 | * | 4/2022 |
| WO | 2022154706 A1 | 7/2022 | |

OTHER PUBLICATIONS

Partial International Search Report—PCT/US2023/023222—ISA/EPO—Sep. 28, 2023.

International Search Report and Written Opinion—PCT/US2023/023222—ISA/EPO—Jan. 2, 2024.

VIVO: "Discussion on UE Behaviour while SCG is Deactivated", 3GPP TSG-RAN WG2 Meeting #117 electronic, R2-2202795, 3rd Generation Partnership Project, Mobile Competence Centre, 650, Route Des Lucioles, F-06921 Sophia-Antipolis Cedex, France, vol. RAN WG2, No. electronic, Feb. 21, 2022-Mar. 3, 2022, Feb. 14, 2022, XP052110664,10 Pages,The Whole Document.

* cited by examiner

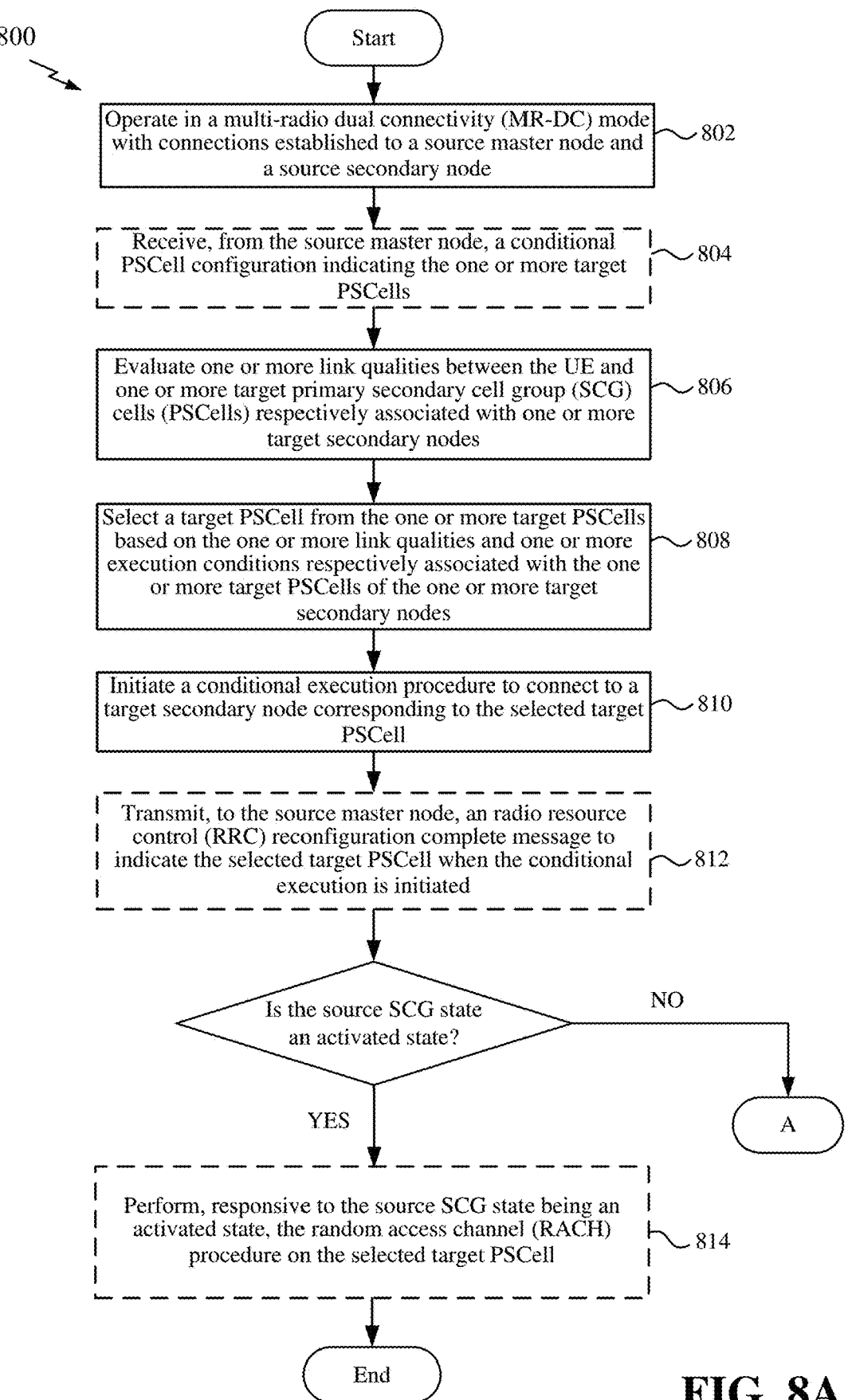

800

Start

Operate in a multi-radio dual connectivity (MR-DC) mode with connections established to a source master node and a source secondary node ～802

Receive, from the source master node, a conditional PSCell configuration indicating the one or more target PSCells ～804

Evaluate one or more link qualities between the UE and one or more target primary secondary cell group (SCG) cells (PSCells) respectively associated with one or more target secondary nodes ～806

Select a target PSCell from the one or more target PSCells based on the one or more link qualities and one or more execution conditions respectively associated with the one or more target PSCells of the one or more target secondary nodes ～808

Initiate a conditional execution procedure to connect to a target secondary node corresponding to the selected target PSCell ～810

Transmit, to the source master node, an radio resource control (RRC) reconfiguration complete message to indicate the selected target PSCell when the conditional execution is initiated ～812

Is the source SCG state an activated state?

NO

YES

A

Perform, responsive to the source SCG state being an activated state, the random access channel (RACH) procedure on the selected target PSCell ～814

End

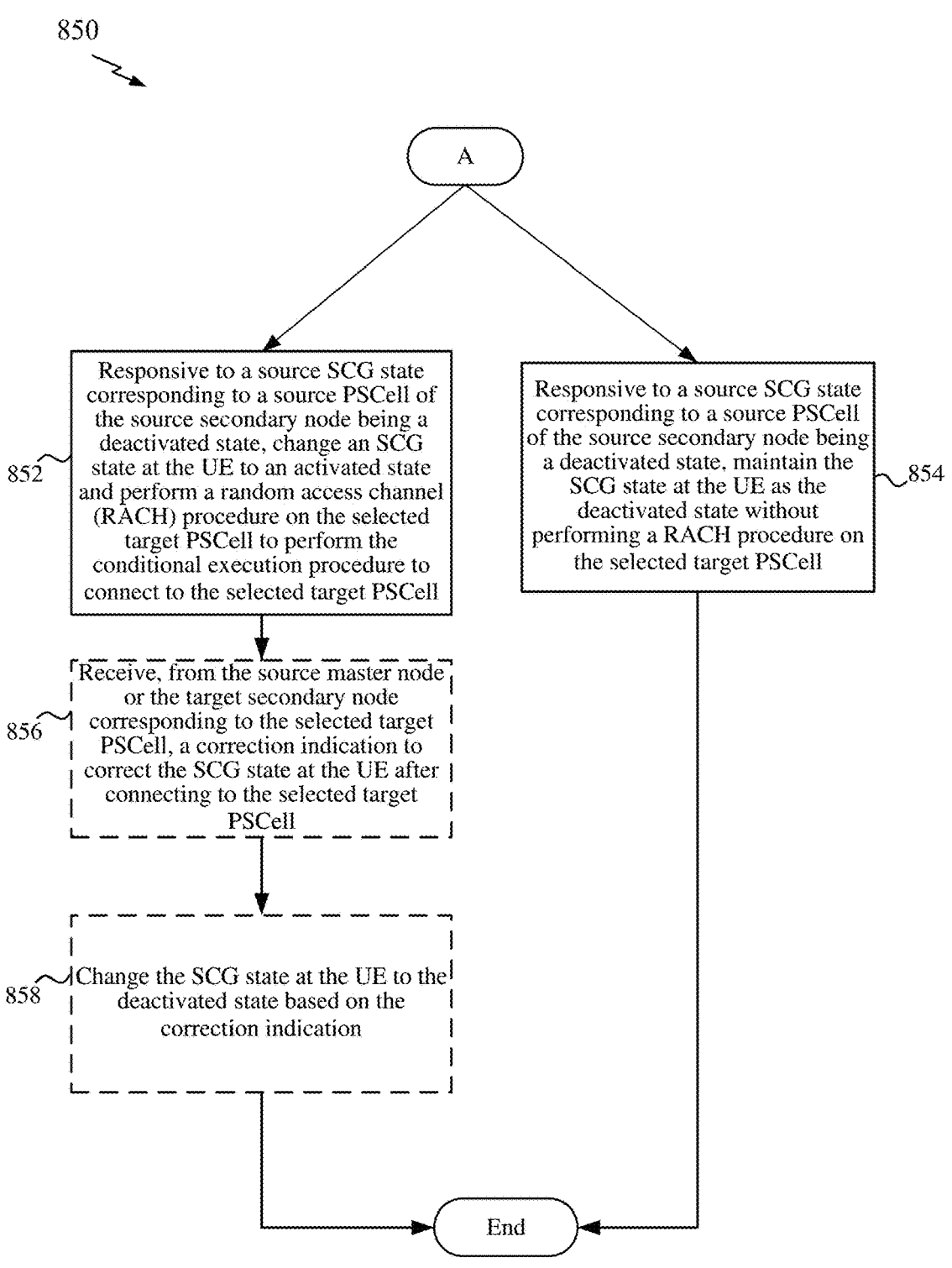

A

852 Responsive to a source SCG state corresponding to a source PSCell of the source secondary node being a deactivated state, change an SCG state at the UE to an activated state and perform a random access channel (RACH) procedure on the selected target PSCell to perform the conditional execution procedure to connect to the selected target PSCell 854 Responsive to a source SCG state corresponding to a source PSCell of the source secondary node being a deactivated state, maintain the SCG state at the UE as the deactivated state without performing a RACH procedure on the selected target PSCell 856 Receive, from the source master node or the target secondary node corresponding to the selected target PSCell, a correction indication to correct the SCG state at the UE after connecting to the selected target PSCell 858 Change the SCG state at the UE to the deactivated state based on the correction indication End

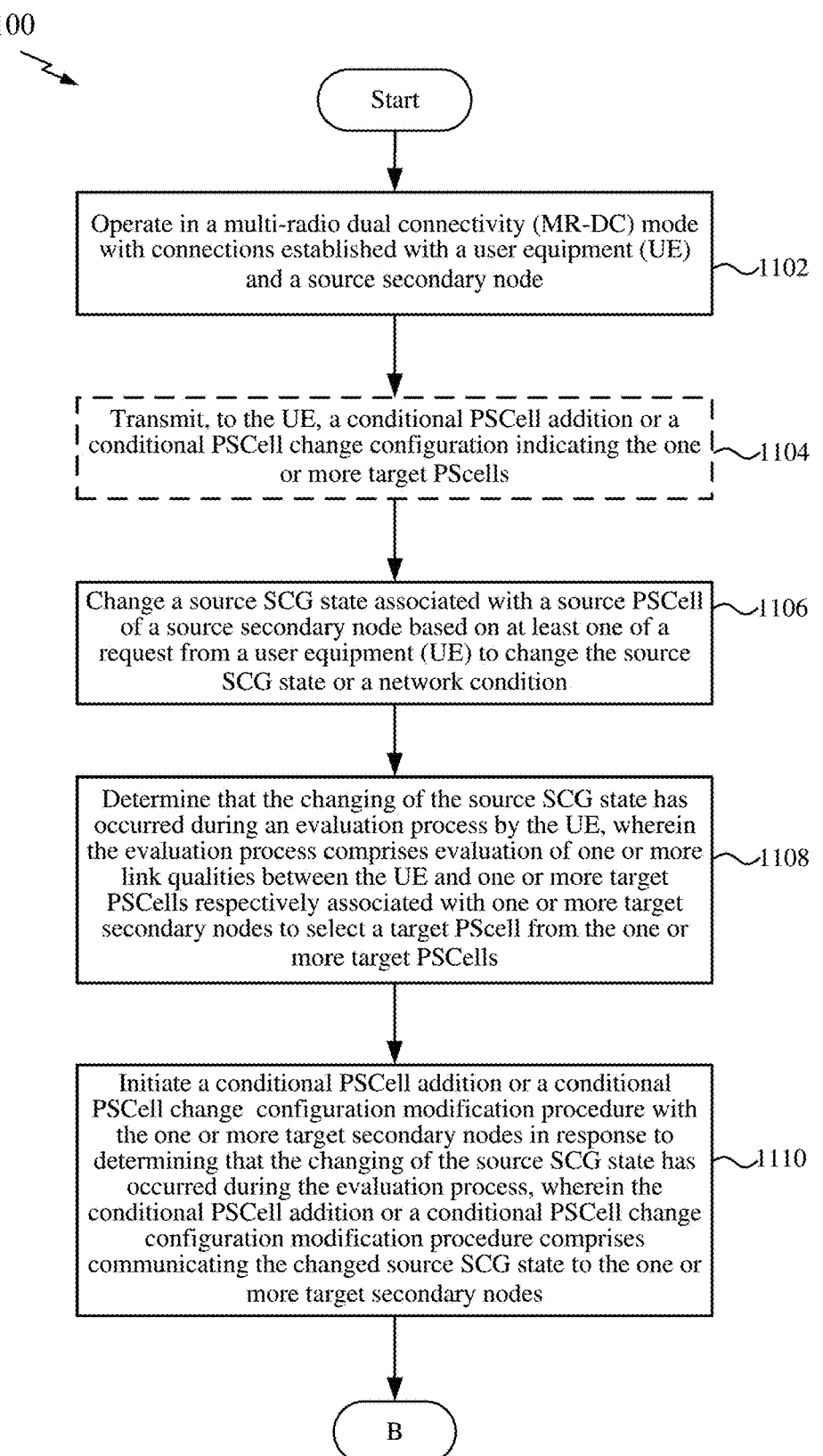

Start

Operate in a multi-radio dual connectivity (MR-DC) mode with connections established with a user equipment (UE) and a source secondary node ⟋1102

Transmit, to the UE, a conditional PSCell addition or a conditional PSCell change configuration indicating the one or more target PScells ⟋1104

Change a source SCG state associated with a source PSCell of a source secondary node based on at least one of a request from a user equipment (UE) to change the source SCG state or a network condition ⟋1106

Determine that the changing of the source SCG state has occurred during an evaluation process by the UE, wherein the evaluation process comprises evaluation of one or more link qualities between the UE and one or more target PSCells respectively associated with one or more target secondary nodes to select a target PScell from the one or more target PSCells ⟋1108

Initiate a conditional PSCell addition or a conditional PSCell change configuration modification procedure with the one or more target secondary nodes in response to determining that the changing of the source SCG state has occurred during the evaluation process, wherein the conditional PSCell addition or a conditional PSCell change configuration modification procedure comprises communicating the changed source SCG state to the one or more target secondary nodes ⟋1110

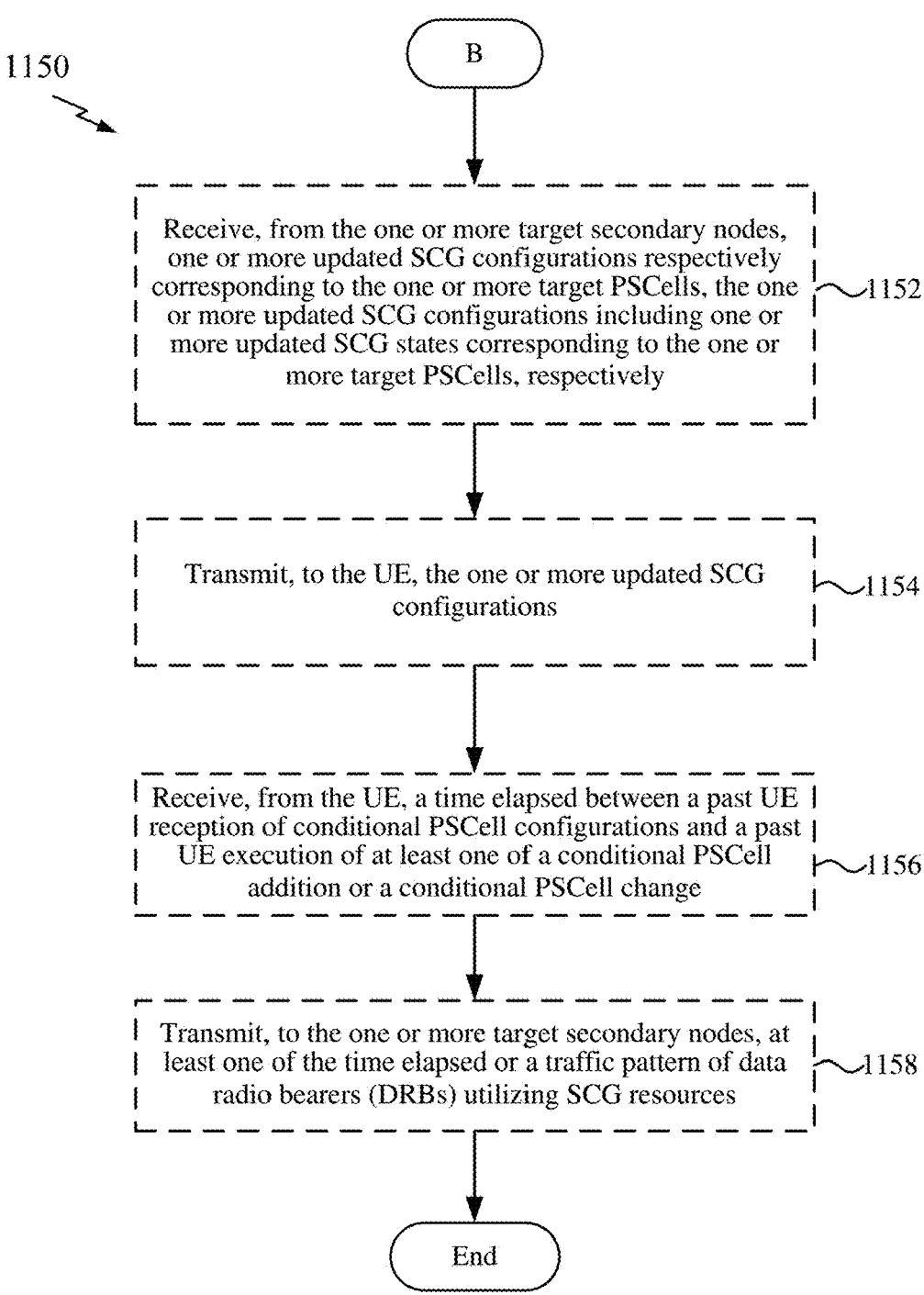

B

Receive, from the one or more target secondary nodes, one or more updated SCG configurations respectively corresponding to the one or more target PSCells, the one or more updated SCG configurations including one or more updated SCG states corresponding to the one or more target PSCells, respectively — 1152

Transmit, to the UE, the one or more updated SCG configurations — 1154

Receive, from the UE, a time elapsed between a past UE reception of conditional PSCell configurations and a past UE execution of at least one of a conditional PSCell addition or a conditional PSCell change — 1156

Transmit, to the one or more target secondary nodes, at least one of the time elapsed or a traffic pattern of data radio bearers (DRBs) utilizing SCG resources — 1158

End

FIG. 11B

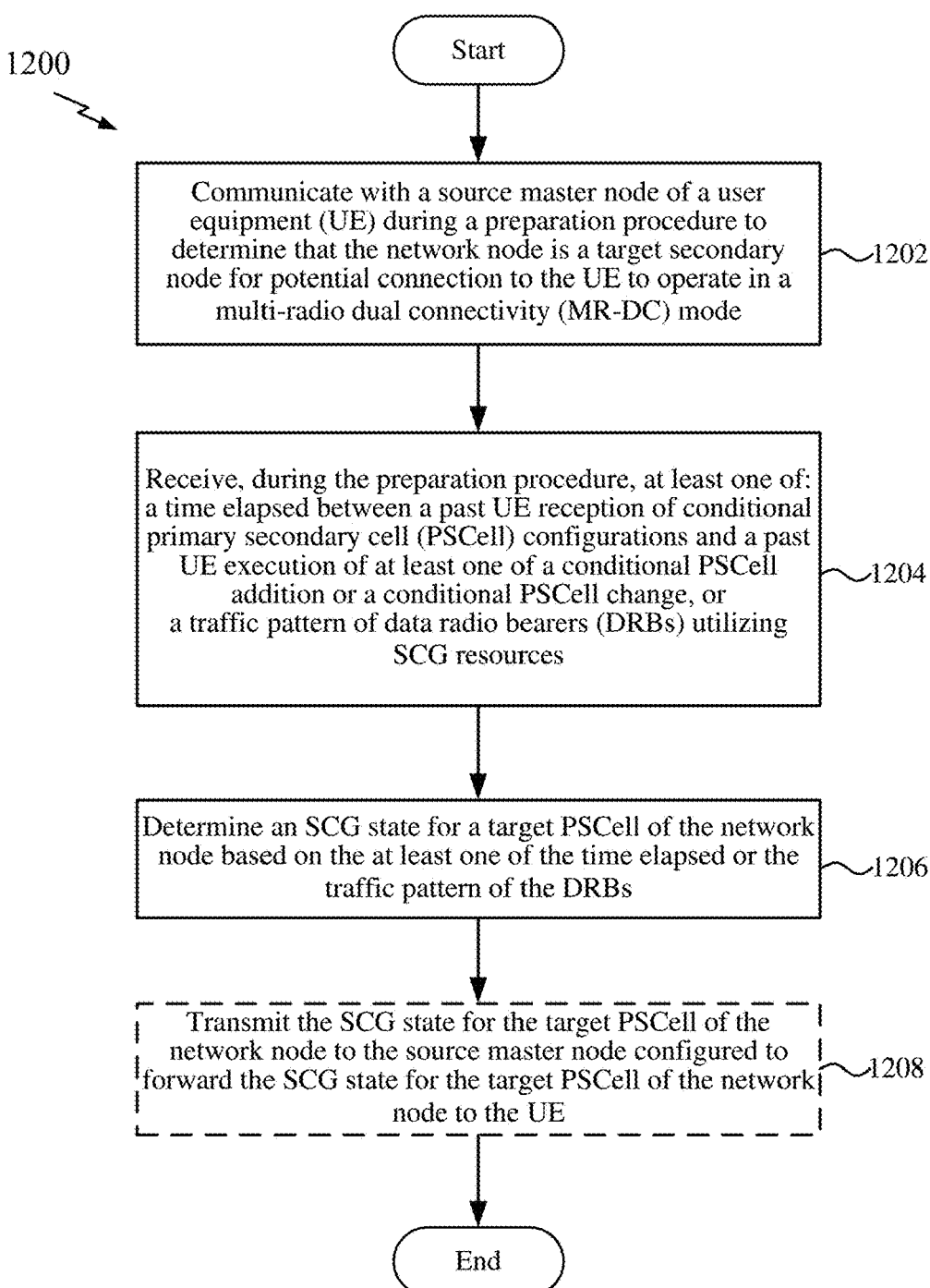

1200

Start

Communicate with a source master node of a user equipment (UE) during a preparation procedure to determine that the network node is a target secondary node for potential connection to the UE to operate in a multi-radio dual connectivity (MR-DC) mode ⟩~1202

Receive, during the preparation procedure, at least one of: a time elapsed between a past UE reception of conditional primary secondary cell (PSCell) configurations and a past UE execution of at least one of a conditional PSCell addition or a conditional PSCell change, or a traffic pattern of data radio bearers (DRBs) utilizing SCG resources ⟩~1204

Determine an SCG state for a target PSCell of the network node based on the at least one of the time elapsed or the traffic pattern of the DRBs ⟩~1206

Transmit the SCG state for the target PSCell of the network node to the source master node configured to forward the SCG state for the target PSCell of the network node to the UE ⟩~1208

End

FIG. 12

SECONDARY CELL GROUP ACTIVATION STATE CONFIGURATION IN MULTIPLE SECONDARY CELL GROUP CONFIGURATIONS

TECHNICAL FIELD

The technology discussed below relates generally to wireless communication systems, and more particularly, to secondary cell group state configurations.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A user equipment (UE) may be served by multiple network nodes simultaneously. For example, the UE may be served by a serving master node and a serving secondary node. Different cells of different network nodes may serve a UE at different times. For example, initially a UE may be served by a cell of a serving secondary node, and subsequently may select a target secondary node to perform a handover from the serving secondary node to the target secondary node.

BRIEF SUMMARY OF SOME EXAMPLES

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In one example, a method of wireless communication by a user equipment (UE) is disclosed. The method includes operating the UE in a multi-radio dual connectivity (MR-DC) mode with connections established to a source master node and a source secondary node; evaluating one or more link qualities between the UE and one or more target primary secondary cell group (SCG) cells (PSCells) respectively associated with one or more target secondary nodes; selecting a target PSCell from the one or more target PSCells based on the one or more link qualities and one or more execution conditions respectively associated with the one or more target PSCells of the one or more target secondary nodes; initiating a conditional execution procedure to connect to a target secondary node corresponding to the selected target PSCell; and responsive to the source SCG state corresponding to a source PSCell of a source secondary node being a deactivated state, performing either: (a) changing an SCG state at the UE to an activated state and performing a random access channel (RACH) procedure on the selected target PSCell to perform the conditional execution procedure to connect to the selected target PSCell, or (b) maintaining the SCG state at the UE as the deactivated state without performing a RACH procedure on the selected target PSCell.

In another example, a UE for wireless communication is disclosed. The UE includes at least one processor, a transceiver communicatively coupled to the at least one processor, and a memory communicatively coupled to the at least one processor. The at least one processor may be configured to: operate the UE in a multi-radio dual connectivity (MR-DC) mode with connections established to a source master node and a source secondary node; evaluate one or more link qualities between the UE and one or more target primary secondary cell group (SCG) cells (PSCells) respectively associated with one or more target secondary nodes; select a target PSCell from the one or more target PSCells based on the one or more link qualities and one or more execution conditions respectively associated with the one or more target PSCells of the one or more target secondary nodes; initiate a conditional execution procedure to connect to a target secondary node corresponding to the selected target PSCell; and responsive to a source SCG state corresponding to a source PSCell of the source secondary node being a deactivated state, perform either: (a) changing an SCG state at the UE to an activated state and performing a random access channel (RACH) procedure on the selected target PSCell to perform the conditional execution procedure to connect to the selected target PSCell, or (b) maintaining the SCG state at the UE as the deactivated state without performing a RACH procedure on the selected target PSCell.

In another example, a non-transitory processor-readable storage medium having instructions for UE thereon may be disclosed. The instructions, when executed by a processing circuit, cause the processing circuit to: operate the UE in a multi-radio dual connectivity (MR-DC) mode with connections established to a source master node and a source secondary node; evaluate one or more link qualities between the UE and one or more target primary secondary cell group (SCG) cells (PSCells) respectively associated with one or more target secondary nodes; select a target PSCell from the one or more target PSCells based on the one or more link qualities and one or more execution conditions respectively associated with the one or more target PSCells of the one or more target secondary nodes; initiate a conditional execution procedure to connect to a target secondary node corresponding to the selected target PSCell; and responsive to the source SCG state corresponding to a source PSCell of a source secondary node being a deactivated state, perform either: (a) changing an SCG state at the UE to an activated state and performing a random access channel (RACH) procedure on the selected target PSCell to perform the conditional execution procedure to connect to the selected target PSCell, or (b) maintaining the SCG state at the UE as the deactivated state without performing a RACH procedure on the selected target PSCell In a further example, a UE for wireless communication may be disclosed. The UE includes means for operating the UE in a multi-radio dual connectivity (MR-DC) mode with connections established to a source master node and a source secondary node; means for evaluating one or more link qualities between the UE and one or more target primary secondary cell group (SCG) cells (PSCells) respectively associated with one or more target secondary nodes, means for selecting a target PSCell from the one or more target PSCells based on the one or more link qualities and one or more execution conditions respectively associated with the one or more target PSCells of the one or more target secondary nodes, means for initiating a conditional execution procedure to connect to a target secondary node corresponding to the selected target PSCell, and means for, responsive to a source SCG state corresponding to a source PSCell of the source secondary node being a deactivated state, performing either: (a) changing an SCG state at the UE to an activated state and performing a random access channel (RACH) procedure on the selected target PSCell to perform the conditional execution procedure to connect to the selected target PSCell, or (b) maintaining the SCG state at the UE as the deactivated state without performing a RACH procedure on the selected target PSCell.

In one example, a method of wireless communication by a network node is disclosed. The method includes operating in a multi-radio dual connectivity (MR-DC) mode with connections established with a user equipment (UE) and a source secondary node; changing a source secondary cell group (SCG) state associated with a source primary SCG cell (PSCell) of the source secondary node based on at least one of a request from the UE to change the source SCG state or a network condition; determining that the changing of the source SCG state has occurred during an evaluation process by the UE, wherein the evaluation process comprises evaluation of one or more link qualities between the UE and one or more target PSCells respectively associated with one or more target secondary nodes to select a target PSCell from the one or more target PSCells; and refraining from notifying the one or more target secondary nodes that the changing of the source SCG state has occurred during the evaluation process.

In another example, a network node for wireless communication is disclosed. The base station includes at least one processor, a transceiver communicatively coupled to the at least one processor, and a memory communicatively coupled to the at least one processor. The at least one processor may be configured to: operate in a multi-radio dual connectivity (MR-DC) mode with connections established with a user equipment (UE) and a source secondary node; change a source secondary cell group (SCG) state associated with a source primary SCG cell (PSCell) of the source secondary node based on at least one of a request from the UE to change the source SCG state or a network condition; determine that the changing of the source SCG state has occurred during an evaluation process by the UE, wherein the evaluation process comprises evaluation of one or more link qualities between the UE and one or more target PSCells respectively associated with one or more target secondary nodes to select a target PSCell from the one or more target PSCells; and refrain from notifying the one or more target secondary nodes that the changing of the source SCG state has occurred during the evaluation process.

In another example, a non-transitory processor-readable storage medium having instructions for a network node thereon may be disclosed. The instructions, when executed by a processing circuit, cause the processing circuit to: operate in a multi-radio dual connectivity (MR-DC) mode with connections established with a user equipment (UE) and a source secondary node; change a source secondary cell group (SCG) state associated with a source primary SCG cell (PSCell) of the source secondary node based on at least one of a request from the UE to change the source SCG state or a network condition; determine that the changing of the source SCG state has occurred during an evaluation process by the UE, wherein the evaluation process comprises evaluation of one or more link qualities between the UE and one or more target PSCells respectively associated with one or more target secondary nodes to select a target PSCell from the one or more target PSCells; and refrain from notifying the one or more target secondary nodes that the changing of the source SCG state has occurred during the evaluation process.

In a further example, a network node for wireless communication may be disclosed. The base station includes means for operating in a multi-radio dual connectivity (MR-DC) mode with connections established with a user equipment (UE) and a source secondary node, means for changing a source secondary cell group (SCG) state associated with a source primary SCG cell (PSCell) of the source secondary node based on at least one of a request from the UE to change the source SCG state or a network condition, means for determining that the changing of the source SCG state has occurred during an evaluation process by the UE, wherein the evaluation process comprises evaluation of one or more link qualities between the UE and one or more target PSCells respectively associated with one or more target secondary nodes to select a target PSCell from the one or more target PSCells, and means for refraining from notifying the one or more target secondary nodes that the changing of the source SCG state has occurred during the evaluation process.

In one example, a method of wireless communication by a network node is disclosed. The method includes operating in a multi-radio dual connectivity (MR-DC) mode with connections established with a user equipment (UE) and a source secondary node; changing a source secondary cell group (SCG) state associated with a source primary SCG cell (PSCell) of the source secondary node based on at least one of a request from the UE to change the source SCG state or a network condition; determining that the changing of the source SCG state has occurred during an evaluation process by the UE, the evaluation process comprising evaluation of one or more link qualities between the UE and one or more target PSCells respectively associated with one or more target secondary nodes to select a target PSCell from the one or more target PSCells; and initiating a conditional PSCell addition or a conditional PSCell change configuration modification procedure with the one or more target secondary nodes in response to determining that the changing of the source SCG state has occurred during the evaluation process, wherein the conditional PSCell addition or a conditional PSCell change configuration modification procedure comprises communicating the changed source SCG state to the one or more target secondary nodes.

In another example, a network node for wireless communication is disclosed. The base station includes at least one processor, a transceiver communicatively coupled to the at least one processor, and a memory communicatively coupled to the at least one processor. The at least one processor may be configured to: operate in a multi-radio dual connectivity (MR-DC) mode with connections established with a user equipment (UE) and a source secondary node; change a source secondary cell group (SCG) state associated with a source primary SCG cell (PSCell) of the source secondary node based on at least one of a request from the UE to change the source SCG state or a network condition; determine that the changing of the source SCG state has occurred during an evaluation process by the UE, the evaluation process comprising evaluation of one or more link qualities between the UE and one or more target PSCells respectively associated with one or more target secondary nodes to select a target PSCell from the one or more target PSCells; and initiate a conditional PSCell addition or a conditional PSCell change configuration modification procedure with the one or more target secondary nodes in response to determining that the changing of the source SCG state has occurred during the evaluation process, wherein the conditional PSCell addition or a conditional PSCell change configuration modification procedure comprises communicating the changed source SCG state to the one or more target secondary nodes.

In another example, a non-transitory processor-readable storage medium having instructions for a network node thereon may be disclosed. The instructions, when executed by a processing circuit, cause the processing circuit to: operate in a multi-radio dual connectivity (MR-DC) mode with connections established with a user equipment (UE) and a source secondary node; change a source secondary cell group (SCG) state associated with a source primary SCG cell (PSCell) of the source secondary node based on at least one of a request from the UE to change the source SCG state or a network condition; determine that the changing of the source SCG state has occurred during an evaluation process by the UE, the evaluation process comprising evaluation of one or more link qualities between the UE and one or more target PSCells respectively associated with one or more target secondary nodes to select a target PSCell from the one or more target PSCells; and initiate a conditional PSCell addition or a conditional PSCell change configuration modification procedure with the one or more target secondary nodes in response to determining that the changing of the source SCG state has occurred during the evaluation process, wherein the conditional PSCell addition or a conditional PSCell change configuration modification procedure comprises communicating the changed source SCG state to the one or more target secondary nodes.

In a further example, a network node for wireless communication may be disclosed. The base station includes means for operating in a multi-radio dual connectivity (MR-DC) mode with connections established with a user equipment (UE) and a source secondary node, means for changing a source secondary cell group (SCG) state associated with a source primary SCG cell (PSCell) of the source secondary node based on at least one of a request from the UE to change the source SCG state or a network condition, means for determining that the changing of the source SCG state has occurred during an evaluation process by the UE, the evaluation process evaluating one or more link qualities between the UE and one or more target PSCells respectively associated with one or more target secondary nodes to select a target PSCell from the one or more target PSCells, and means for initiating a conditional PSCell addition or a conditional PSCell change configuration modification procedure with the one or more target secondary nodes in response to determining that the changing of the source SCG state has occurred during the evaluation process, wherein the conditional PSCell addition or a conditional PSCell change configuration modification procedure comprises communicating the changed source SCG state to the one or more target secondary nodes.

In one example, a method of wireless communication by a network node is disclosed. The method includes communicating with a source master node of a user equipment (UE) during a preparation procedure to determine that the network node is a target secondary node for potential connection to the UE to operate in a multi-radio dual connectivity (MR-DC) mode; receiving, during the preparation procedure, at least one of: a time elapsed between a past UE reception of conditional primary secondary cell (PSCell) configurations and a past UE execution of at least one of a conditional PSCell addition or a conditional PSCell change, or a traffic pattern of data radio bearers (DRBs) utilizing SCG resources; determining an SCG state for a target PSCell of the network node based on the at least one of the time elapsed or the traffic pattern of the DRBs.

In another example, a network node for wireless communication is disclosed. The base station includes at least one processor, a transceiver communicatively coupled to the at least one processor, and a memory communicatively coupled to the at least one processor. The at least one processor may be configured to: communicate with a source master node of a user equipment (UE) during a preparation procedure to determine that the network node is a target secondary node for potential connection to the UE to operate in a multi-radio dual connectivity (MR-DC) mode; receive, during the preparation procedure, at least one of: a time elapsed between a past UE reception of conditional primary secondary cell (PSCell) configurations and a past UE execution of at least one of a conditional PSCell addition or a conditional PSCell change, or a traffic pattern of data radio bearers (DRBs) utilizing SCG resources; determine an SCG state for a target PSCell of the network node based on the at least one of the time elapsed or the traffic pattern of the DRBs.

In another example, a non-transitory processor-readable storage medium having instructions for a network node thereon may be disclosed. The instructions, when executed by a processing circuit, cause the processing circuit to: communicate with a source master node of a user equipment (UE) during a preparation procedure to determine that the network node is a target secondary node for potential connection to the UE to operate in a multi-radio dual connectivity (MR-DC) mode; receive, during the preparation procedure, at least one of: a time elapsed between a past UE reception of conditional primary secondary cell (PSCell) configurations and a past UE execution of at least one of a conditional PSCell addition or a conditional PSCell change, or a traffic pattern of data radio bearers (DRBs) utilizing SCG resources; determine an SCG state for a target PSCell of the network node based on the at least one of the time elapsed or the traffic pattern of the DRBs.

In a further example, a network node for wireless communication may be disclosed. The base station includes means for communicating with a source master node of a user equipment (UE) during a preparation procedure to determine that the network node is a target secondary node for potential connection to the UE to operate in a multi-radio dual connectivity (MR-DC) mode; means for receiving, during the preparation procedure, at least one of: a time elapsed between a past UE reception of conditional primary secondary cell (PSCell) configurations and a past UE execution of at least one of a conditional PSCell addition or a conditional PSCell change, or a traffic pattern of data radio bearers (DRBs) utilizing SCG resources; means for determining an SCG state for a target PSCell of the network node based on the at least one of the time elapsed or the traffic pattern of the DRBs.

These and other aspects of the disclosure will become more fully understood upon a review of the detailed description, which follows. Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

FIG. 8 (8A and 8B) is a flow chart illustrating an exemplary process for wireless communication according to some aspects.

FIG. 11 (11A and 11B) is a flow chart illustrating an exemplary process for wireless communication according to some aspects.

FIG. 12 is a flow chart illustrating an exemplary process for wireless communication according to some aspects.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

Figure 1:
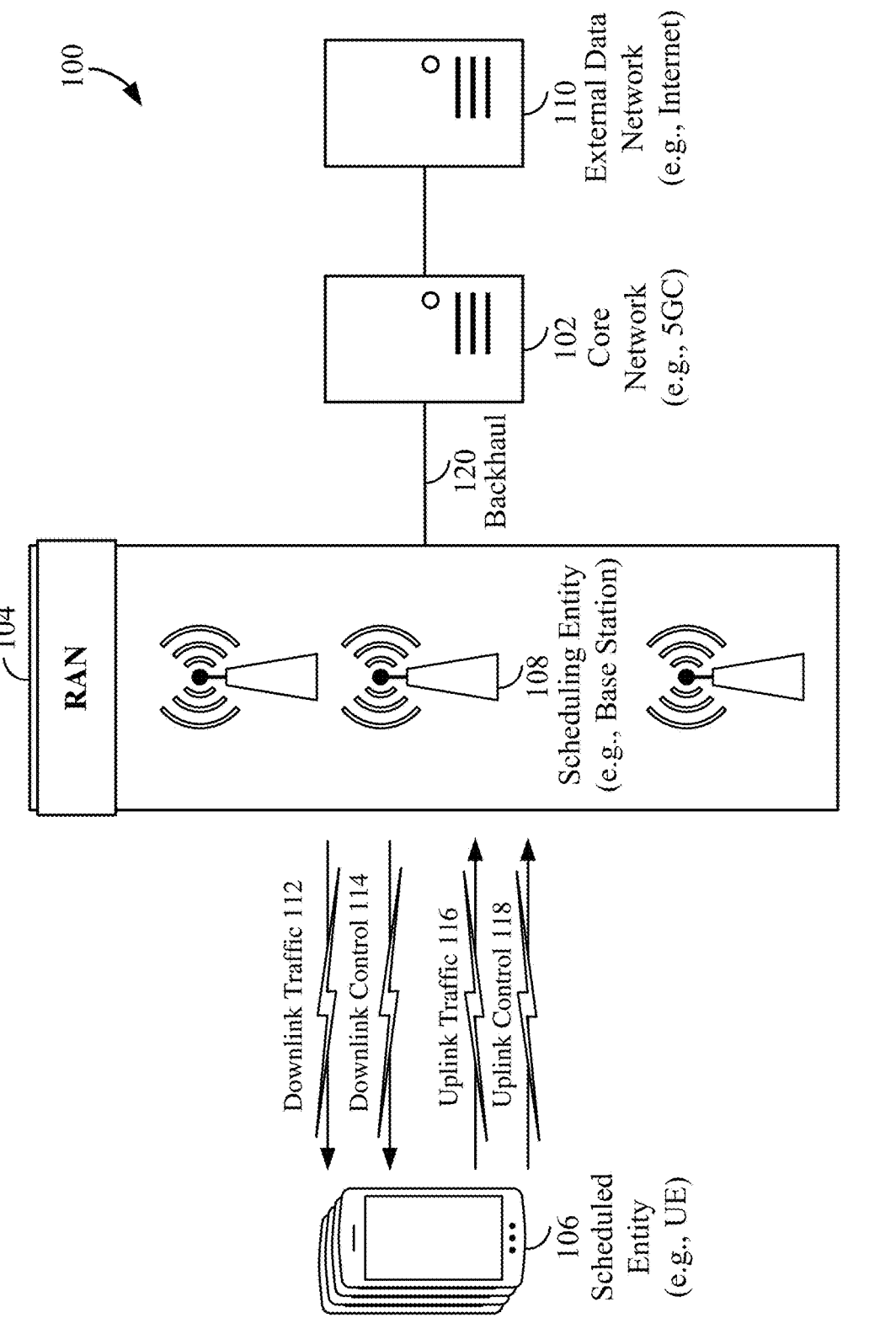
FIG. 1 is a schematic illustration of a wireless communication system according to some aspects.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to $3^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP) or some other suitable terminology. In some examples, a base station may include two or more TRPs that may be collocated or non-collocated.

Each TRP may communicate on the same or different carrier frequency within the same or different frequency band.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus (e.g., a mobile apparatus) that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; vehicles, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
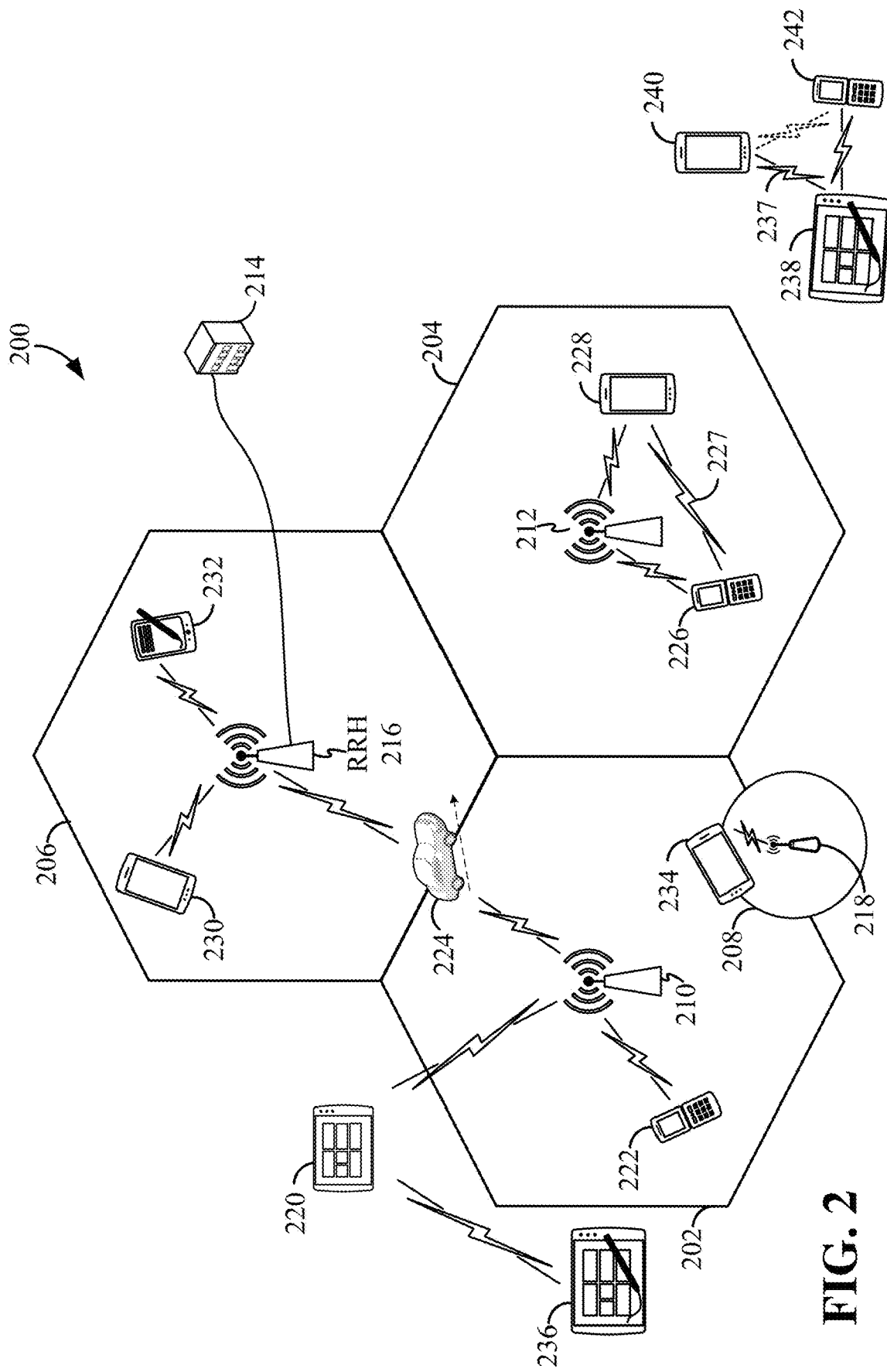
FIG. 2 is a conceptual illustration of an example of a radio access network according to some aspects.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 126 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

FIG. 2 further includes a mobile device 220, which may be configured to function as a base station. That is, in some examples, a cell may not necessarily be stationary, and the geographic area of the cell may move according to the location of a mobile base station such as the mobile device 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as the UE/scheduled entity 106 described above and illustrated in FIG. 1.

In some examples, a mobile network node (e.g., mobile device 220) may be configured to function as a UE. For example, the mobile device 220 may operate within cell 202 by communicating with base station 210.

In a further aspect of the RAN 200, sidelink signals may be used between UEs without necessarily relying on scheduling or control information from a base station. For example, two or more UEs (e.g., UEs 226 and 228) may communicate with each other using peer to peer (P2P) or sidelink signals 227 without relaying that communication through a base station (e.g., base station 212). In a further example, UE 238 is illustrated communicating with UEs 240 and 242. Here, the UE 238 may function as a scheduling entity or a primary sidelink device, and UEs 240 and 242 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 240 and 242 may optionally communicate directly with one another in addition to communicating with the scheduling entity 238. Thus, in a wireless communication system with scheduled access to time-frequency resources and having a cellular configuration, a P2P configuration, or a mesh configuration, a scheduling entity and one or more scheduled entities may communicate utilizing the scheduled resources.

In the radio access network 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) that manages the security context for both the control plane and the user plane functionality, and a security anchor function (SEAF) that performs authentication.

In various aspects of the disclosure, a radio access network 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the radio access network 200. Each of the cells may measure a strength of the pilot signal, and the radio access network (e.g., one or more of the base stations 210 and 214/216 and/or a central node within the core network) may determine a serving cell for the UE 224. As the UE 224 moves through the radio access network 200, the network may continue to monitor the uplink pilot signal transmitted by the UE 224. When the signal strength or quality of the pilot signal measured by a neighboring cell exceeds that of the signal strength or quality measured by the serving cell, the network 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

Various aspects of the present disclosure will be described with reference to an OFDM waveform, schematically illustrated in FIG. 3. It should be understood by those of ordinary skill in the art that the various aspects of the present disclosure may be applied to a DFT-s-OFDMA waveform in substantially the same way as described herein below. That is, while some examples of the present disclosure may focus on an OFDM link for clarity, it should be understood that the same principles may be applied as well to DFT-s-OFDMA waveforms.

Within the present disclosure, a frame refers to a duration of 10 ms for wireless transmissions, with each frame consisting of 10 subframes of 1 ms each. On a given carrier, there may be one set of frames in the UL, and another set of frames in the DL. Referring now to FIG. 3, an expanded view of an exemplary DL subframe 302 is illustrated, showing an OFDM resource grid 304. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers or tones.

The resource grid 304 may be used to schematically represent time—frequency resources for a given antenna port. That is, in a MIMO implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time—frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

A UE generally utilizes only a subset of the resource grid 304. An RB may be the smallest unit of resources that can be allocated to a UE. Thus, the more RBs scheduled for a UE, and the higher the modulation scheme chosen for the air interface, the higher the data rate for the UE.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each subframe 302 (e.g., a 1 ms subframe) may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots having a shorter duration (e.g., 1, 2, 4, or 7 OFDM symbols). These mini-slots may in some cases be transmitted occupying resources scheduled for ongoing slot transmissions for the same or for different UEs.

An expanded view of one of the slots 310 illustrates the slot 310 including a control region 312 and a data region 314. In general, the control region 312 may carry control channels (e.g., PDCCH), and the data region 314 may carry data channels (e.g., PDSCH or PUSCH). Of course, a slot may contain all DL, all UL, or at least one DL portion and at least one UL portion. The simple structure illustrated in FIG. 3 is merely exemplary in nature, and different slot structures may be utilized, and may include one or more of each of the control region(s) and data region(s).

Figure 3:
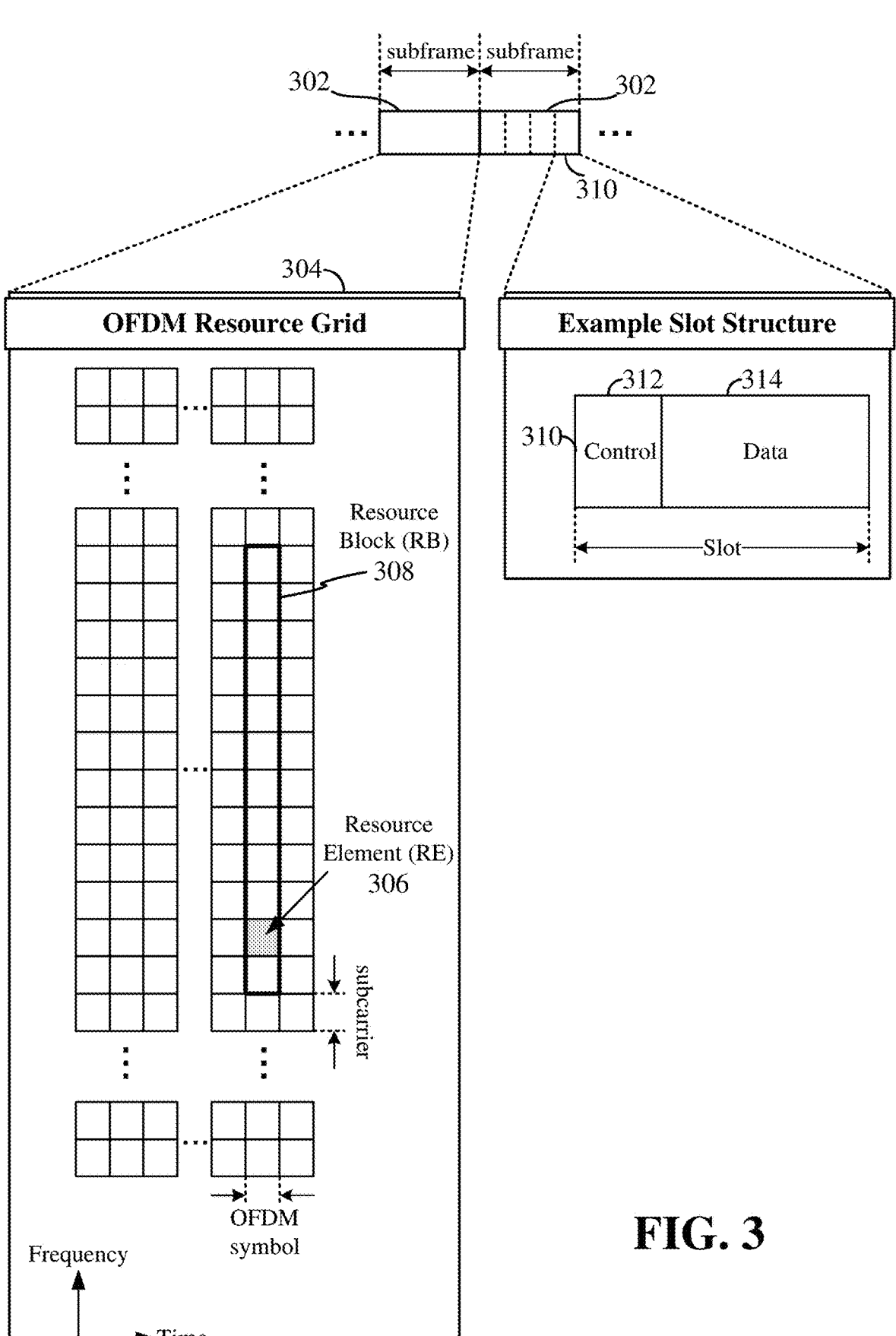
FIG. 3 is a schematic illustration of an organization of wireless resources in an air interface utilizing orthogonal frequency divisional multiplexing (OFDM) according to some embodiments.

Although not illustrated in FIG. 3, the various REs 306 within an RB 308 may be scheduled to carry one or more physical channels, including control channels, shared channels, data channels, etc. Other REs 306 within the RB 308 may also carry pilots or reference signals. These pilots or reference signals may provide for a receiving device to perform channel estimation of the corresponding channel, which may enable coherent demodulation/detection of the control and/or data channels within the RB 308.

In some examples, the slot 310 may be utilized for broadcast or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 306 (e.g., within the control region 312) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 306 (e.g., in the control region 312 or the data region 314) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 40, 80, or 140 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional system information. Examples of system information transmitted in the MIB may include, but are not limited to, a subcarrier spacing, system frame number, a configuration of a PDCCH control resource set (CORESET) (e.g., PDCCH CORESET0), and a search space for SIB1. Examples of additional system information transmitted in the SIB1 may include, but are not limited to, a random access search space, downlink configuration information, and uplink configuration information. The MIB and SIB1 together provide the minimum system information (SI) for initial access.

In an UL transmission, the scheduled entity (e.g., UE) may utilize one or more REs 306 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 306 (e.g., within the data region 314) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry other signals, such as one or more SIB s and DMRSs.

In an example of sidelink communication over a sidelink carrier via a PC5 interface, the control region 312 of the slot 310 may include a physical sidelink control channel (PSCCH) including sidelink control information (SCI) transmitted by an initiating (transmitting) sidelink device (e.g., Tx V2X device or other Tx UE) towards a set of one or more other receiving sidelink devices (e.g., Rx V2X device or other Rx UE). The data region 314 of the slot 310 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 306 within slot 310. For example, HARQ feedback information may be transmitted in a physical sidelink feedback channel (PSFCH) within the slot 310 from the receiving sidelink device to the transmitting sidelink device.

The channels or carriers described above and illustrated in FIGS. 1 and 3 are not necessarily all the channels or carriers that may be utilized between a scheduling entity 108 and scheduled entities 106, and those of ordinary skill in the art will recognize that other channels or carriers may be utilized in addition to those illustrated, such as other traffic, control, and feedback channels.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

5G-NR networks may further support carrier aggregation (CA) of component carriers transmitted from different cells and/or different transmission and reception points (TRPs) in a multi-cell transmission environment. The different TRPs may be associated with a single serving cell or multiple serving cells. In some aspects, the term component carrier may refer to a carrier frequency (or band) utilized for communication within a cell.

Figure 4:
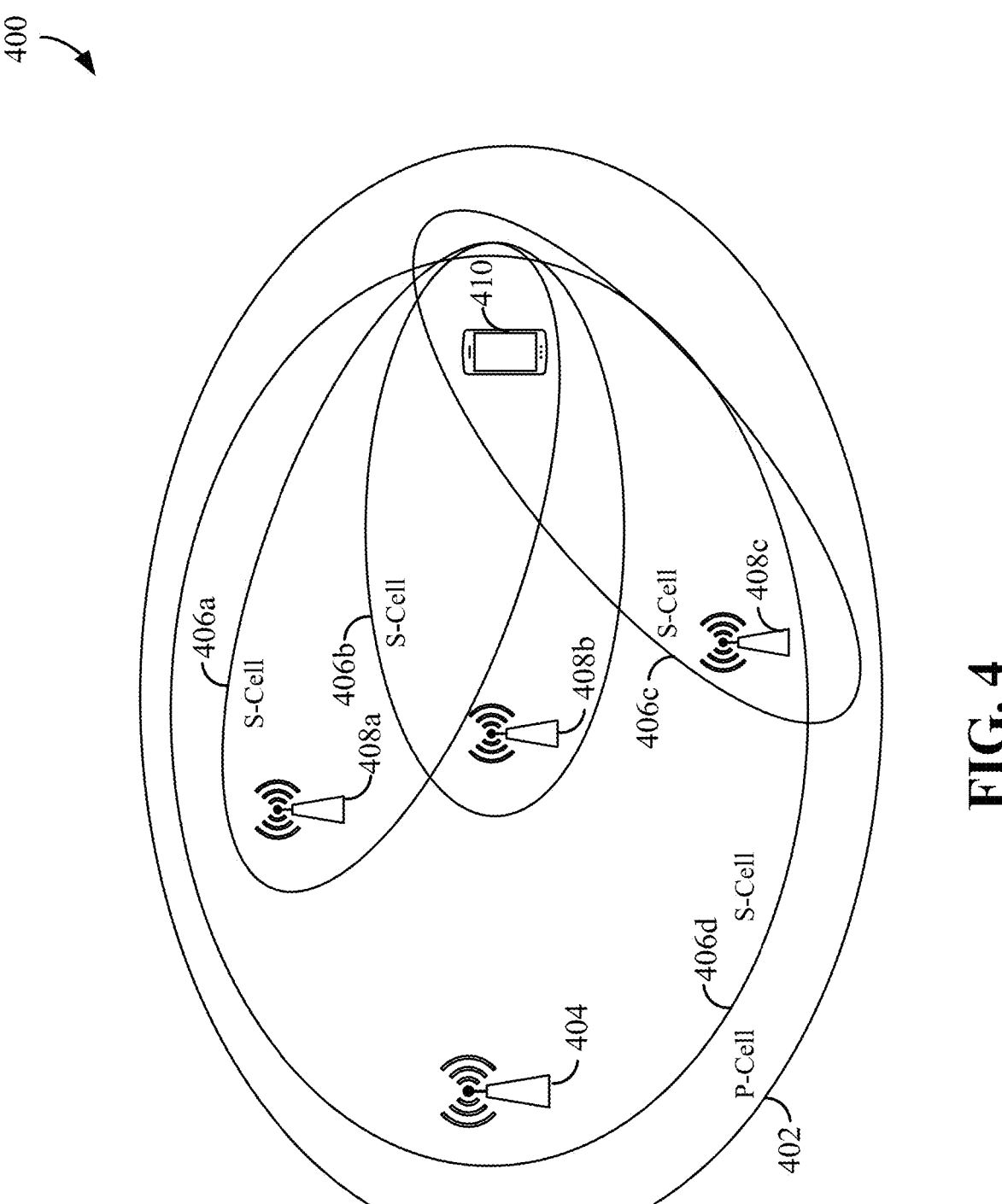
FIG. 4 is a conceptual illustration of wireless communication via multiple radio frequency (RF) carriers according to some aspects.

FIG. 4 is a conceptual illustration of a wireless communication system that shows a base station (BS) and a user equipment (UE) communicating via multiple carriers according to some aspects. In particular, FIG. 4 shows an example of a wireless communication system 400 that includes a primary serving cell (PCell) 402 and one or more secondary serving cells (SCells) 406a, 406b, 406c, and 406d. The PCell 402 may be referred to as the anchor cell that provides a radio resource control (RRC) connection to the UE 410. In some examples, the PCell and the SCell may be co-located (e.g., different TRPs at the same location). The UE 410 may correspond to any of the UEs or scheduled entities shown in any of FIGS. 1, 2, and 5-8.

One or more of the SCells 406a-406d may be activated or added to the PCell 402 to form the serving cells serving the UE 410. Each serving cell corresponds to a component carrier (CC). The CC of the PCell 402 may be referred to as a primary CC, and the CC of a SCell 406a-406d may be referred to as a secondary CC. The PCell 402 and one or more of the SCells 406 may be served by a respective base station 404 and 408a-408c or scheduling entity similar to those illustrated in any of FIGS. 1, 2, 4, and In the example shown in FIG. 4, SCells 406a-406c are each served by a respective base station 408a-408c. SCell 406d is co-located with the PCell 402. For example, the base station 404 may include multiple TRPs, each supporting a different carrier. The coverages of the PCell 402 and SCell 406d may differ since component carriers in different frequency bands may experience different path loss.

In some examples, the PCell 402 may add or remove one or more of the SCells 406a-406d to improve reliability of the connection to the UE 410 and/or increase the data rate. The PCell 402 may be changed upon a handover to another PCell.

In some examples, the PCell 402 may utilize a first radio access technology (RAT), such as LTE, while one or more of the SCells 406 may utilize a second RAT, such as 5G-NR. In this example, the multi-cell transmission environment may be referred to as a multi-RAT-dual connectivity (MR-DC) environment. One example of MR-DC is Evolved-Universal Terrestrial Radio Access Network (E-UTRAN)-New Radio (NR) dual connectivity (EN-DC) mode that enables a UE to simultaneously connect to an LTE base station and a NR base station to receive data packets from and send data packets to both the LTE base station and the NR base station.

In some examples, the PCell 402 may be a low band cell, and the SCells 406 may be high band cells. A low band (LB) cell uses a CC in a frequency band lower than that of the high band cells. For example, the high band cells may use millimeter wave (mmW) CC, and the low band cell may use a CC in a band (e.g., sub-6 GHz band) lower than mmW. In general, a cell using a mmW CC can provide greater bandwidth than a cell using a low band CC. In addition, when using a frequency carrier that is above 6 GHz (e.g., mmW), beamforming may be used to transmit and receive signals in some examples.

Figure 5:
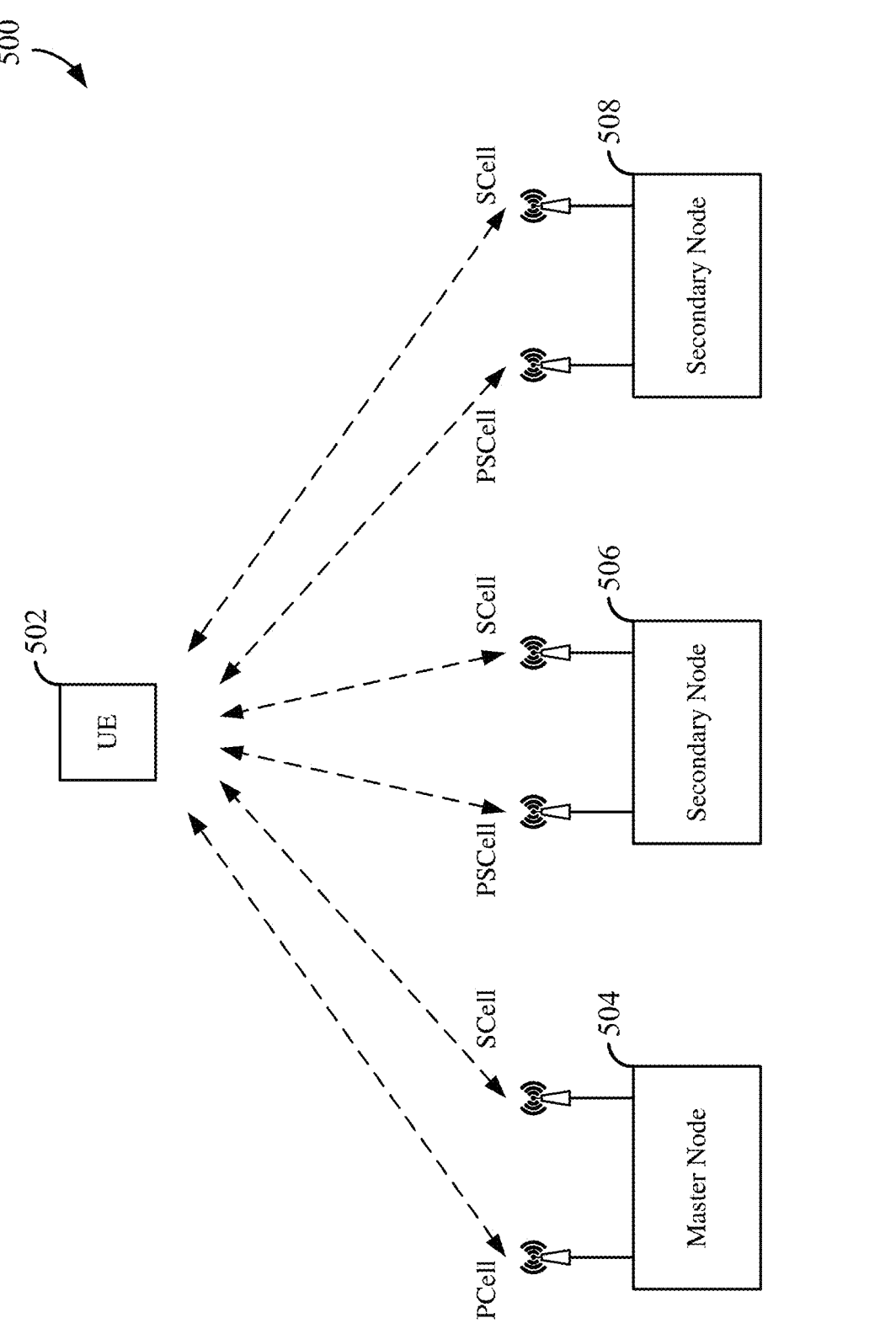
FIG. 5 is a conceptual illustration of an example of a master cell group (MCG) and secondary cell groups (SCGs) according to some aspects.

FIG. 5 is a conceptual illustration of a wireless communication system where a UE 502 may be served by a master node (MN) 504 and one or more secondary nodes (e.g., a first secondary node (SN) 506 and/or a second SN 508). A master cell group (MCG) is associated with the MN 504 and includes a PCell and an SCell in this example. A first secondary cell group (SCG) is associated with the first SN 506 and includes two SCells in this example A second SCG is associated with the second SN 508 and includes two SCells in this example. Different examples may include a different number of SCells. The UE 502 may correspond to any of the UEs or scheduled entities shown in any of FIGS. 1, 2, 4, 5, and 7-12. The MN 504 may correspond to any of the BSs (e.g., gNBs, eNBs, MNs, etc.) or scheduling entities shown in any of FIGS. 1, 2, 4, 5, and 7-13. The first SN 506 and the second SN 508 may correspond to any of the BSs (e.g., gNBs, eNBs, SNs, etc.) or scheduling entities shown in any of FIGS. 1, 2, 4, 5, and 7-13.

The MN 504 may select the first SCG or the second SCG for an MR-DC configuration. The MN 504 may then select one of the SCells of the selected SCG to be the PSCell for the SCG (e.g., as indicated in FIG. 5). Thus, for a PSCell selection process, one or more of the SCells of an SCG may be deemed to be a candidate PSCell.

The PSCell(s) used for serving the UE 502 may change over time. For example, due to traffic conditions at the MN 504 or some other factor, the MN 504 may elect to add another PSCell for serving the UE 502. As another example, due to signaling conditions between the UE 502 and one or more of the current PSCells (e.g., as determined from signal measurements made by the UE 502), the MN 504 or one of the PSCells may elect to change out one or more PSCells. For example, a current PSCell (which may be referred to as a source SN) may identify (e.g., based on signal measurements by the UE 502) another PSCell (which may be referred to as a target SN or target PSCell) that will provide better service for the UE 502.

In some aspects, adding/changing a PSCell configuration may be conditional in that an addition of a target PCell or a change to a target PSCell may be conditioned on signal measurements made at the UE. Here, the UE may verify whether the signaling conditions between the UE and the target PCell are acceptable. If so (e.g., the reference signal received power (RSRP) measured at the UE meets a defined criterion), the addition or change may be made.

In a wireless communication system, dual connectivity (DC) aims to utilize radio resources within multiple carriers. DC can be used to increase throughput, provide mobility robustness, support load-balancing among network nodes, and/or the like. A DC mode of operation is a mode in which a UE (e.g., the UE 502) is configured to utilize radio resources of two distinct schedulers located in two network nodes (e.g., the MN 504 and the first SN 506). These network nodes are referred to as a master node (MN) and a secondary node (SN). Thus, DC enables a UE to simultaneously transmit and receive data on multiple component carriers from groups of cells via the MN and the SN. In the context of DC, a master cell group (MCG) is a group of serving cells associated with the MN and includes a primary cell (PCell) and optionally one or more secondary cells (SCells). Further, a secondary cell group (SCG) is a group of serving cells associated with the SN and includes a primary secondary cell (PSCell) and optionally one or more SCells. Multiple cells in each node may be in a carrier aggregation framework.

The UE may be configured with particular configurations by a serving MN (S-MN) and/or a serving SN (S-SN) that are currently serving the UE, such that the UE may select a PSCell belonging to one of the target SNs to connect. For example, if the UE loses connectivity to a currently-serving PSCell, then the UE may perform a handover to a target PSCell of one of target SNs. A procedure of the UE performing a handover to a target PSCell may be referred to as a PSCell change procedure. A procedure of the UE newly connecting to an SN may be referred to as a PSCell addition procedure. Hence, a conditional PSCell change (CPC) procedure is for the UE to perform a handover to a target PSCell when a particular condition is satisfied, and a conditional PSCell addition (CPA) procedure is for the UE to newly connect to an SN when a particular condition is satisfied.

In CPC and CPA procedures, SCG configurations (and associated MCG configurations) may be provided to the UE, where the SCG configurations may include radio bearer (RB) configurations and execution conditions respectively associated with target PSCells for executing a CPA or a CPC. In some aspects, if an execution condition associated with a particular target PSCell is satisfied, the UE may trigger an execution of a CPA or a CPC to connect to the particular target PSCell. For example, the execution condition may include a signal quality threshold associated with a particular target PSCell, such that the UE may trigger an execution of a CPA or CPC when a signal quality with the particular target PSCell exceeds the signal quality threshold. In some aspects, an RRC reconfiguration message from a network node (e.g., S-MN) may provide the UE with the SCG configurations corresponding to target PSCells and associated SCGs. The SCG configurations may be set during a preparation procedure, which involves communications between the S-MN, the S-SN, and the target SNs, prior to sending the RRC reconfiguration message to the UE.

After the UE executes a CPA or a CPC, the UE may delete the CPA or CPC configurations provided by the S-MN (e.g., via the RRC reconfiguration message). If the UE needs to execute another CPA or CPC procedure, the UE may be reconfigured by the S-MN (e.g., by another reconfiguration message) to perform the next conditional PSCell addition or change. For example, because the UE may be served by a different secondary node after the execution of the CPA or the CPC, the network may need to perform a new preparation procedure, and the UE may need to be reconfigured (e.g., by another reconfiguration message).

In some aspects, all configurations needed to perform a sequence of PSCell changes or additions, without requiring the UE to be reconfigured every time after a change or an addition, may be provided at once to the UE. For example, after the preparation procedure, the S-MN may send a CPC configuration message (CPC_config) to the UE, such that the UE may perform a sequence of PSCell additions or changes without triggering the preparation procedure every time after an execution of a change or an addition.

In some aspects, an SCG state for a particular SCG of a network node may be set to an activated state or a deactivated state. Hence, the SCG state for a particular SCG may indicate whether the particular SCG is utilized for data communication or not. In some aspects, if little or no data is communicated to a cell of a particular network node of an SCG for a certain amount of time, the particular network node may set the SCG state associated with the particular network node to a deactivated state (e.g., to reduce power consumption). On the other hand, if there is data communication to a cell of a particular network node of an SCG, the particular network node may set the SCG state associated with the particular network node to an activated state. An SCG state for each network node may be included in an SCG configuration communicated to the UE. In some examples, if the network node determines that there will be no data transmission taking place over a certain SCG for a certain amount of time, the network node may set the SCG state to a deactivated state. For example, the network node may transmit the SCG state to the UE to cause the UE to set the SCG state at the UE to an SCG deactivated state if there is little or no data transmission to the particular SCG, and/or if, according to a data traffic profile (e.g., based on the past history), little or no data transmission to the particular SCG is expected during a certain time frame. If the SCG state corresponding to a particular cell is a deactivated state, the UE may set the SCG state at the UE to a deactivated state and may not communicate with the particular cell (or other cells within the same SCG), e.g., by staying in a low-power mode. As such, power and resources may be conserved when there is little or no communication. If the SCG state corresponding to the particular cell is an activated state, the UE may set the SCG state at the UE to an activated state and may perform data communication with the particular cell (and/or other cells within the same SCG).

Figure 6:
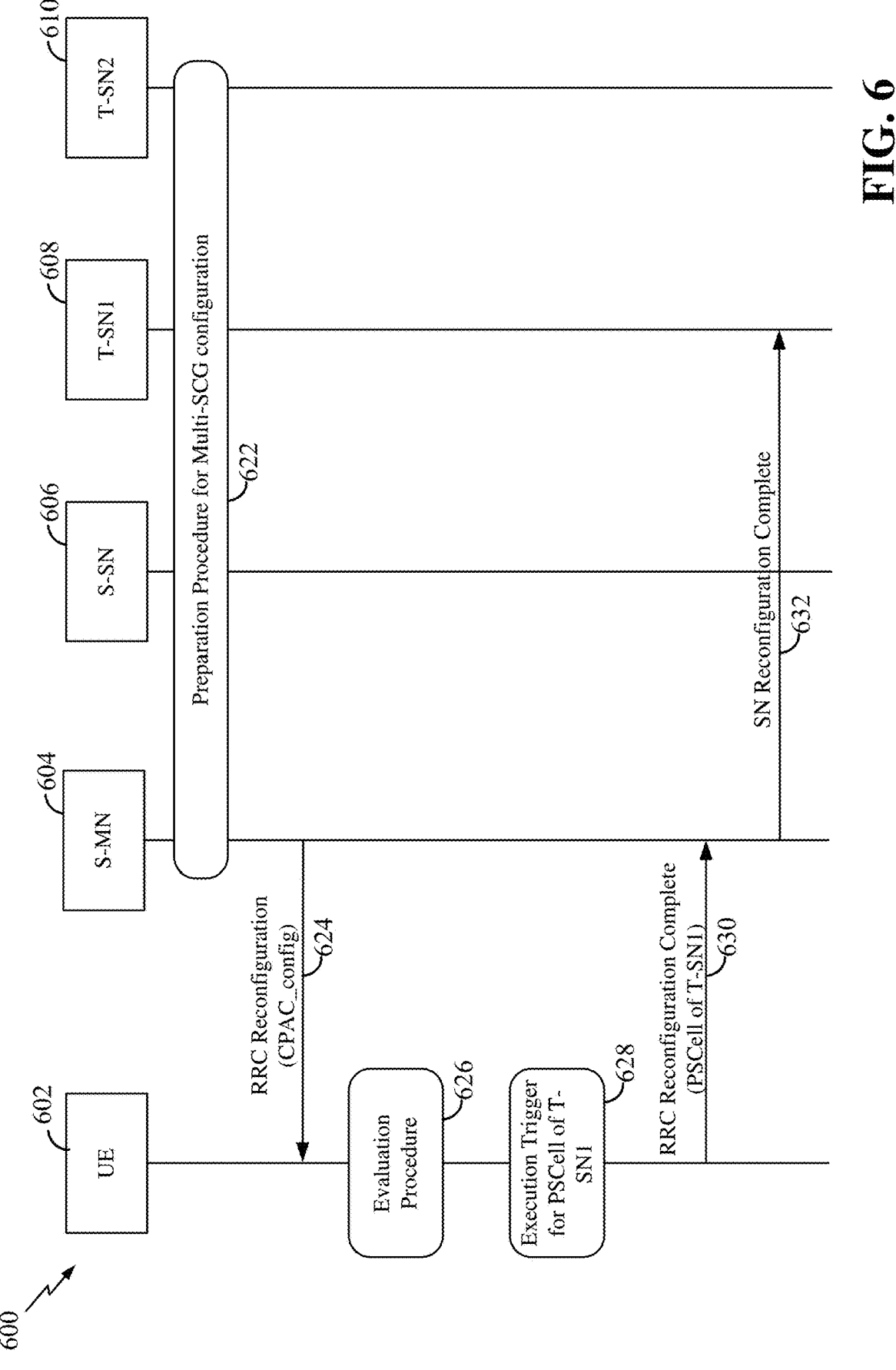
FIG. 6 is an example diagram illustrating a process to execute a conditional PSCell change or a conditional PSCell addition, according to some aspects

FIG. 6 is an example diagram illustrating a process to execute a conditional PSCell change or a conditional PSCell addition, according to some aspects. FIG. 6 shows communications among a UE 602, an S-MN 604, an S-SN 606, a first target SN 608, and a second target SN 610.

At 622, during a preparation procedure, the first target SN 608 may determine a first SCG state corresponding to the first target SN 608 and a first execution condition for connecting to the first target SN 608, and the second target SN 610 may determine a second SCG state corresponding to the second target SN 610 and a second execution condition for connecting to the second target SN 610. The first SCG state and the second SCG state may be included in an SCG configuration. The S-MN 604 may generate a CPA or CPC configuration that includes the SCG configuration and execution conditions for a conditional PSCell addition or a conditional PSCell change, such as the first execution condition and the second execution condition. For example, the first execution condition may include a first signal quality threshold and the second execution condition may include a second signal quality threshold, for satisfying the condition for a PSCell addition/change. At 624, the S-MN 604 may transmit an RRC reconfiguration message including the CPA or CPC configuration to the UE 602. When the UE 602 receives the CPA or CPC configuration, the UE 602 may be in an SCG activated state or in an SCG deactivated state with regard to the first target SN 608 based on the first SCG state received from the S-MN 604, and may be in an SCG activated state or in an SCG deactivated state with regard to the second target SN 610 based on the second SCG state received from the S-MN 604.

At 626, the UE 602 may perform an evaluation process, by evaluating a first link quality between the UE 602 and the first target SN 608 and a second link quality between the UE 602 and the second target SN 610, based on the respective execution conditions. For example, the UE 602 may determine whether the first link quality satisfies the first execution condition (e.g., by exceeding the first signal quality threshold) associated with the first target SN 608, and may determine whether the second link quality satisfies the second execution condition (e.g., by exceeding the second signal quality threshold) associated with the second target SN 610. The UE 602 may determine to connect to a target SN that satisfies the execution condition.

In the example of FIG. 6, the UE 602 determines that the first target SN 608 satisfies the execution condition. Hence, at 628, the UE 602 may trigger an execution of a CPA or a CPC to connect to a PSCell of the first target SN 608. Therefore, at 630, the UE 602 transmits an RRC reconfiguration complete message to the S-MN 604 to indicate that the RRC reconfiguration has been completed and that the CPA or the CPC has been executed to connect to the PSCell of the first target SN 608. Subsequently, at 632, the S-MN 604 transmits an SN reconfiguration complete message to the first target SN 608. When the execution is triggered at 628, the UE 602 may set an SCG state at the UE 602 based on the SCG state for the selected PSCell, where the SCG state is indicated in the SCG configuration. For example, if the evaluation process 626 selects the first target SN 608, the UE 602 may set the SCG state at the UE 602 according to the first SCG state of the first target SN 608 when the execution is triggered.

Upon triggering the execution at 628, the UE 602 may perform a RACH process on the selected PSCell depending on the SCG state for the selected PSCell, where the SCG state is indicated in the SCG configuration. For example, the UE 602 may perform a RACH process with the first target SN 608 if the first SCG state indicated in the SCG configuration is the activated state, and may not perform the RACH process otherwise.

The exact time when the UE will execute a CPA or CPC is not known. The execution time of the PSCell change may depend on the UE's movement and/or a pattern of the UE's motion, which is difficult to predict. Although a data traffic profile (e.g., based on a history) may be available, it is still difficult to predict the exact time when the data communication will occur. Because the exact time when a conditional execution gets triggered is not known, a target SN may not set the SCG state of a target PSCell of the target SN to a deactivated state. In other words, a default state of the SCG state of a target PSCell may be an activated state, in the multi-SCG configurations in both multi-SCG preparation and modification procedures.

During the preparation procedure, each target SN may set its respective SCG state. A target SN may determine the SCG state based on a data traffic profile. The target SN still does not know the exact time when the conditional execution will be triggered, and thus as a default setting, the SCG state may be set as activated.

When the UE receives a source SCG state associated with a source PSCell of the S-SN, the UE may set its SCG state at the UE based on the received source SCG state. Subsequently, the data communication activity by the UE may change. In some aspects, based on the change in the data communication activity, the UE may attempt to change the SCG state at the UE and the source SCG state. For example, the UE may transmit a request to change the source SCG state to the S-MN. When the S-MN receives such a request, the S-MN may determine whether to change the SCG state based on the request and based on its communication with the S-SN. In some aspects, the S-MN may make such a determination autonomously based on a network condition (e.g., network traffic). If the S-MN determines to change the source SCG state, the S-MN may transmit a source SCG change indication to the UE to indicate the changed source SCG state.

According to some aspects of the disclosure, when the UE is connected to an S-SN, if a source SCG state associated with a source PSCell of the S-SN changes during an evaluation process when the UE is evaluating the target PSCells, the S-MN may not inform the target SNs of the change in the source SCG state. For example, if the source SCG state changes during the evaluation process, the S-MN may not initiate a CPA or CPC configuration modification procedure to inform the target SNs of the change in the source SCG state, where the CPA or CPC configuration modification procedure is for modifying the initial CPA or CPC configuration already provided to the UE via the RRC reconfiguration message. However, as discussed above, because the exact time when a conditional execution gets triggered is not known, the target SN may not set the SCG state of a target PSCell to the deactivated state and the SCG state of a target PSCell is in the activated state as a default. Because the target SN does not set the SCG state, there is no need for the S-MN to inform the target SN of the change in the source SCG state during the evaluation process. The S-MN and the S-SN may determine to change the source SCG state depending on whether there's traffic, but may not inform the target SN of the change in the source SCG state during the evaluation process.

Prior to the execution of the CPA or the CPC to connect to a particular target SN, the UE may be in a particular SCG state based on the source SCG state. If the source SCG state is the activated state at the execution of the CPA or the CPC, the UE may continue with the SCG state at the UE being the activated state. However, if the source SCG state is the deactivated state, then currently an approach for the UE to set the SCG at the UE has not been explored, considering that the default setting for the SCG state for a target PSCell is the activated state, as discussed above.

According to some aspects of the disclosure, in a first option, if the source SCG state is the deactivated state when the execution of the CPA or the CPC is triggered, the UE may change the SCG state at the UE to an activated state and perform a random access channel (RACH) procedure on the particular target PSCell to connect to the particular target PSCell. In some aspects, because the source SCG state is the deactivated state and the SCG state at the UE is changed to the activated state, the S-MN or the selected target SN may transmit a correction indication to the UE after the UE connects to the selected target PSCell, such that the UE may change the SCG state at the UE back to the deactivated state based on the correction indication.

In a second option, according to some aspects of the disclosure, if the source SCG state is the deactivated state when the execution of the CPA or the CPC is triggered, the UE may leave the SCG state at the UE as the deactivated state without performing a RACH procedure on the particular target PSCell.

Alternatively, the S-MN may always update the target SNs of changes in the source SCG state associated with the source SCG of the S-SN. Hence, according to some aspects of the disclosure, if the source SCG state changes during an evaluation process where the UE is evaluating the target PSCells, the S-MN may perform a CPA or CPC configuration modification procedure to inform the target SNs of the changed source SCG state.

Subsequently, in some aspects, the target SNs may provide updated SCG configurations respectively corresponding to the PSCells, where the updated SCG configurations include updated SCG states corresponding to the PSCells. Hence, the updated SCG configurations may be generated based on the changed source SCG state informed by the S-MN. When the S-MN receives the updated SCG configurations, the S-MN may transmit the updated SCG configurations to the UE, e.g., via another RRC configuration message.

In a self-organizing network (SON), the UE may report to a network node successful handover reports, which may include time elapsed between reception of a conditional handover configuration and a conditional handover execution. Use of such reports have not been explored in conditional PSCell changes or conditional PSCell additions.

According to some aspects of the disclosure, the UE may report, to a source node (e.g., S-MN or S-SN), successful conditional PSCell change or addition reports including similar parameters, such as a time elapsed between a past UE reception of conditional PSCell configurations and a past UE execution of a CPA and/or a CPC. In some aspects, the source node (e.g., S-MN or S-SN) may provide this information to a target SN during a preparation procedure to help determine the SCG state to be used upon execution of a CPA or a CPC. In some aspects, S-MN or S-SN may also provide information regarding a traffic pattern of data radio bearers (DRBs) utilizing SCG resources, to help determine the SCG state to be used upon execution of a CPA or a CPC. A traffic pattern may consist of ON-OFF periods, where data traffic is expected during the ON period and no data traffic is expected during the OFF duration, e.g., based on a past history of data traffic. After the target SN receives the time elapsed and/or the traffic pattern, the target SN may determine an SCG based on such information. For example, assuming that the time elapsed is 63 seconds and the traffic pattern indicates a pattern of 10 seconds of data traffic (ON) followed by 15 seconds of no traffic (OFF) that occurs repeatedly, the target SN will be able to predict whether there will be data traffic when the execution takes place and thus determine an SCG state based on such a prediction.

Figure 7:
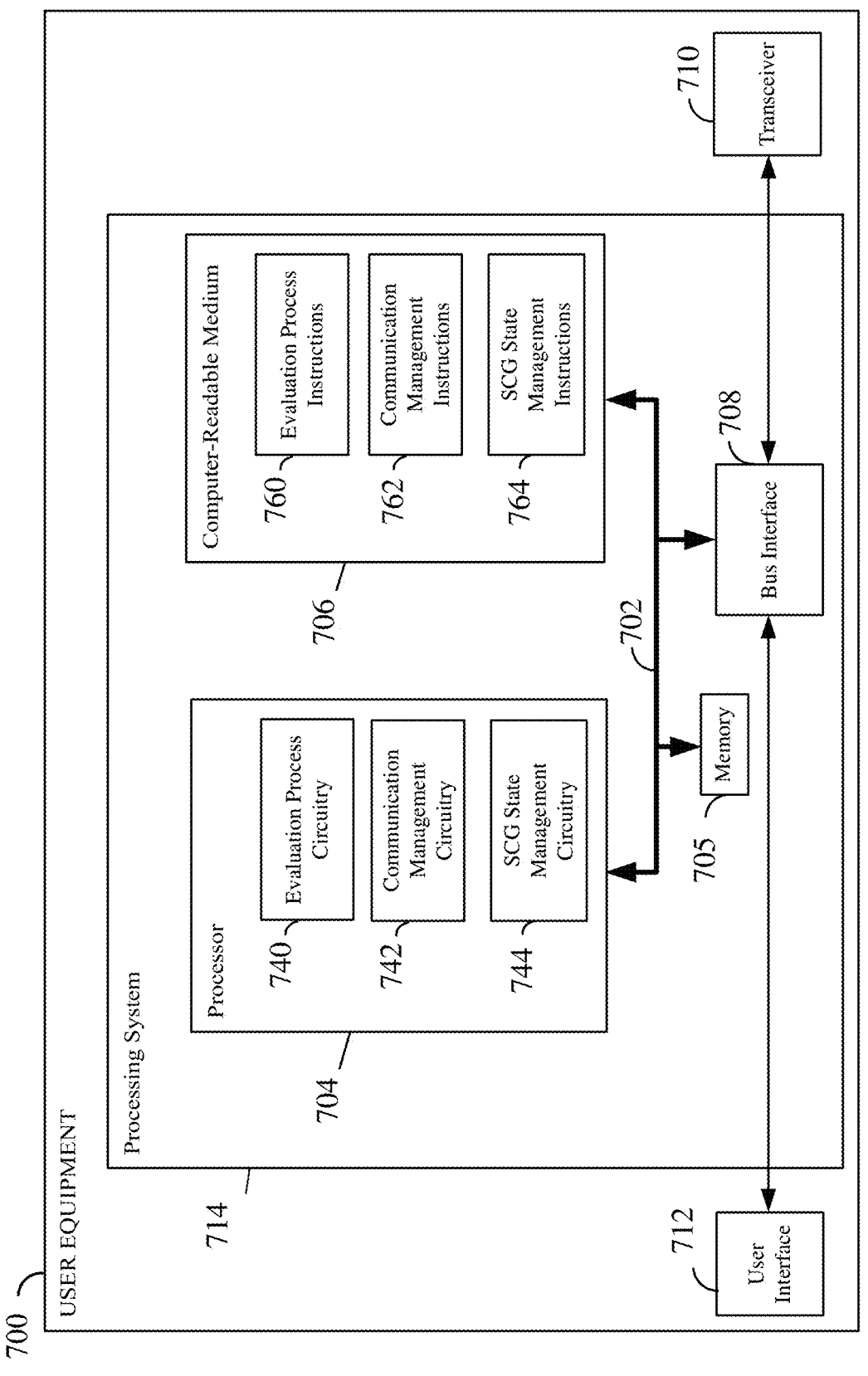
FIG. 7 is a block diagram conceptually illustrating an example of a hardware implementation for a user equipment (UE) according to some aspects.

FIG. 7 is a block diagram illustrating an example of a hardware implementation for a UE 700 employing a processing system 714. For example, the UE 700 may be a user equipment (UE) as illustrated in any one or more of FIGS. 1, 2, 4, 5, and/or 6.

The UE 700 may be implemented with a processing system 714 that includes one or more processors 704. Examples of processors 704 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the UE 700 may be configured to perform any one or more of the functions described herein. That is, the processor 704, as utilized in a UE 700, may be used to implement any one or more of the processes and procedures described below and illustrated in FIG. 8.

In this example, the processing system 714 may be implemented with a bus architecture, represented generally by the bus 702. The bus 702 may include any number of interconnecting buses and bridges depending on the specific application of the processing system 714 and the overall design constraints. The bus 702 communicatively couples together various circuits including one or more processors (represented generally by the processor 704), a memory 705, and computer-readable media (represented generally by the computer-readable storage medium 706). The bus 702 may also link various other circuits such as timing sources, peripherals, voltage regulators, and power management circuits, which are well known in the art, and therefore, will not be described any further. A bus interface 708 provides an interface between the bus 702 and a transceiver 710. The transceiver 710 provides a communication interface or means for communicating with various other apparatus over a transmission medium. Depending upon the nature of the apparatus, a user interface 712 (e.g., keypad, display, speaker, microphone, joystick) may also be provided. Of course, such a user interface 712 is optional, and may be omitted in some examples, such as a base station.

In some aspects of the disclosure, the processor 704 may include evaluation process circuitry 740 configured for various functions, including, for example, receiving, from the source master node, a conditional PSCell configuration indicating the one or more target PSCells. For example, the evaluation process circuitry 740 may be configured to implement one or more of the functions described below in relation to FIG. 8, including, e.g., block 804.

In some aspects, the evaluation process circuitry 740 may be configured for various functions, including, for example, evaluating one or more link qualities between the UE and one or more target primary secondary cell group (SCG) cells (PSCells) respectively associated with one or more target secondary nodes. For example, the evaluation process circuitry 740 may be configured to implement one or more of the functions described below in relation to FIG. 8, including, e.g., block 806.

In some aspects, the evaluation process circuitry 740 may be configured for various functions, including, for example, selecting a target PSCell from the one or more target PSCells based on the one or more link qualities and one or more execution conditions respectively associated with the one or more target PSCells of the one or more target secondary nodes. For example, the evaluation process circuitry 740 may be configured to implement one or more of the functions described below in relation to FIG. 8, including, e.g., block 808.

In some aspects of the disclosure, the processor 704 may include communication management circuitry 742 configured for various functions, including, for example, operating in a multi-radio dual connectivity (MR-DC) mode with connections established to a source master node and a source secondary node. For example, the communication management circuitry 742 may be configured to implement one or more of the functions described below in relation to FIG. 8, including, e.g., block 802.

In some aspects, the communication management circuitry 742 may be configured for various functions, including, for example, initiating a conditional execution procedure to connect to a target secondary node corresponding to the selected target PSCell. For example, the communication management circuitry 742 may be configured to implement one or more of the functions described below in relation to FIG. 8, including, e.g., block 810.

In some aspects, the communication management circuitry 742 may be configured for various functions, including, for example, transmitting, to the source master node, an radio resource control (RRC) reconfiguration complete message to indicate the selected target PSCell when the conditional execution procedure is initiated. For example, the communication management circuitry 742 may be configured to implement one or more of the functions described below in relation to FIG. 8, including, e.g., block 812.

In some aspects, the communication management circuitry 742 may be configured for various functions, including, for example, performing, responsive to the source SCG state being an activated state, the random access channel (RACH) procedure on the selected target PSCell. For example, the communication management circuitry 742 may be configured to implement one or more of the functions described below in relation to FIG. 8, including, e.g., block 814.

In some aspects, the communication management circuitry 742 may be configured for various functions, including, for example, responsive to a source SCG state corresponding to a source PSCell of the source secondary node being a deactivated state, performing either changing an SCG state at the UE to an activated state and perform a random access channel (RACH) procedure on the selected target PSCell to perform the conditional execution procedure to connect to the selected target PSCell, or maintaining the SCG state at the UE as the deactivated state without performing a RACH procedure on the selected target PSCell. For example, the communication management circuitry 742 may be configured to implement one or more of the functions described below in relation to FIG. 8, including, e.g., blocks 852 and 854.

In some aspects where the SCG state at the UE is set to the activated state and the RACH procedure is performed on the selected target PSCell, in conjunction with the conditional execution procedure, the communication management circuitry 742 may be configured for various functions, including, for example, receiving, from the source master node or the target secondary node corresponding to the selected target PSCell, a correction indication to correct the SCG state at the UE after connecting to the selected target PSCell. For example, the communication management circuitry 742 may be configured to implement one or more of the functions described below in relation to FIG. 8, including, e.g., block 856.

In some aspects of the disclosure, the processor 704 may include SCG state management circuitry 744 configured for various functions, including, for example, changing the SCG state at the UE to the deactivated state based on the correction indication. For example, the SCG state management circuitry 744 may be configured to implement one or more of the functions described below in relation to FIG. 8, including, e.g., block 858.

In some aspects, the communication management circuitry 742 and the SCG state management circuitry 744 may be configured for various functions, including, for example, responsive to a source SCG state corresponding to a source PSCell of the source secondary node being a deactivated state, performing either changing an SCG state at the UE to an activated state and perform a random access channel (RACH) procedure on the selected target PSCell to perform the conditional execution procedure to connect to the selected target PSCell, or maintaining the SCG state at the UE as the deactivated state without performing a RACH procedure on the selected target PSCell. For example, the communication management circuitry 742 and the SCG state management circuitry 744 may be configured to implement one or more of the functions described below in relation to FIG. 8, including, e.g., blocks 852 and 854.

The processor 704 is responsible for managing the bus 702 and general processing, including the execution of software stored on the computer-readable storage medium 706. The software, when executed by the processor 704, causes the processing system 714 to perform the various functions described below for any particular apparatus. The computer-readable storage medium 706 and the memory 705 may also be used for storing data that is manipulated by the processor 704 when executing software.

One or more processors 704 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable storage medium 706. The computer-readable storage medium 706 may be a non-transitory computer-readable storage medium. A non-transitory computer-readable storage medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable storage medium 706 may reside in the processing system 714, external to the processing system 714, or distributed across multiple entities including the processing system 714. The computer-readable storage medium 706 may be embodied in a computer program product. By way of example, a computer program product may include a computer-readable storage medium in packaging materials. Those skilled in the art will recognize how best to implement the described functionality presented throughout this disclosure depending on the particular application and the overall design constraints imposed on the overall system.

In some aspects of the disclosure, the computer-readable storage medium 706 may include evaluation process software/instructions 760 configured for various functions, including, for example, receiving, from the source master node, a conditional PSCell configuration indicating the one or more target PSCells. For example, the evaluation process software/instructions 760 may be configured to implement one or more of the functions described below in relation to FIG. 8, including, e.g., block 804.

In some aspects, the evaluation process software/instructions 760 may be configured for various functions, including, for example, evaluating one or more link qualities between the UE and one or more target primary secondary cell group (SCG) cells (PSCells) respectively associated with one or more target secondary nodes. For example, the evaluation process software/instructions 760 may be configured to implement one or more of the functions described below in relation to FIG. 8, including, e.g., block 806.

In some aspects, the evaluation process software/instructions 760 may be configured for various functions, including, for example, selecting a target PSCell from the one or more target PSCells based on the one or more link qualities and one or more execution conditions respectively associated with the one or more target PSCells of the one or more target secondary nodes. For example, the evaluation process software/instructions 760 may be configured to implement one or more of the functions described below in relation to FIG. 8, including, e.g., block 808.

In some aspects of the disclosure, the computer-readable storage medium 706 may include communication management software/instructions 762 configured for various functions, including, for example, operating in a multi-radio dual connectivity (MR-DC) mode with connections established to a source master node and a source secondary node. For example, the communication management software/instructions 762 may be configured to implement one or more of the functions described below in relation to FIG. 8, including, e.g., block 802.

In some aspects, the communication management software/instructions 762 may be configured for various functions, including, for example, initiating a conditional execution procedure to connect to a target secondary node corresponding to the selected target PSCell. For example, the communication management software/instructions 762 may be configured to implement one or more of the functions described below in relation to FIG. 8, including, e.g., block 810.

In some aspects, the communication management software/instructions 762 may be configured for various functions, including, for example, transmitting, to the source master node, an radio resource control (RRC) reconfiguration complete message to indicate the selected target PSCell when the conditional execution procedure is initiated. For example, the communication management software/instructions 762 may be configured to implement one or more of the functions described below in relation to FIG. 8, including, e.g., block 812.

In some aspects, the communication management software/instructions 762 may be configured for various functions, including, for example, performing, responsive to the source SCG state being an activated state, the random access channel (RACH) procedure on the selected target PSCell. For example, the communication management software/instructions 762 may be configured to implement one or more of the functions described below in relation to FIG. 8, including, e.g., block 814.

In some aspects, the communication management software/instructions 762 may be configured for various functions, including, for example, responsive to a source SCG state corresponding to a source PSCell of the source secondary node being a deactivated state, performing either changing an SCG state at the UE to an activated state and perform a random access channel (RACH) procedure on the selected target PSCell to perform the conditional execution procedure to connect to the selected target PSCell, or maintaining the SCG state at the UE as the deactivated state without performing a RACH procedure on the selected target PSCell. For example, the communication management software/instructions 762 may be configured to implement one or more of the functions described below in relation to FIG. 8, including, e.g., blocks 852 and 854.

In some aspects where the SCG state at the UE is set to the activated state and the RACH procedure is performed on the selected target PSCell, in conjunction with the conditional execution procedure, the communication management software/instructions 762 may be configured for various functions, including, for example, receiving, from the source master node or the target secondary node corresponding to the selected target PSCell, a correction indication to correct the SCG state at the UE after connecting to the selected target PSCell. For example, the communication management software/instructions 762 may be configured to implement one or more of the functions described below in relation to FIG. 8, including, e.g., block 856.

In some aspects of the disclosure, the computer-readable storage medium 706 may include SCG state management software/instructions 764 configured for various functions, including, for example, changing the SCG state at the UE to the deactivated state based on the correction indication. For example, the SCG state management software/instructions 764 may be configured to implement one or more of the functions described below in relation to FIG. 8, including, e.g., block 858.

In some aspects, the communication management software/instructions 762 and the SCG state management software/instructions 764 may be configured for various functions, including, for example, responsive to a source SCG state corresponding to a source PSCell of the source secondary node being a deactivated state, performing either changing an SCG state at the UE to an activated state and perform a random access channel (RACH) procedure on the selected target PSCell to perform the conditional execution procedure to connect to the selected target PSCell, or maintaining the SCG state at the UE as the deactivated state without performing a RACH procedure on the selected target PSCell. For example, the communication management software/instructions 762 and the SCG state management software/instructions 764 may be configured to implement one or more of the functions described below in relation to FIG. 8, including, e.g., blocks 852 and 854.

FIG. 8A is a flow chart illustrating an exemplary process 800 for wireless communication by a user equipment (UE) in accordance with some aspects. As described below, some or all illustrated features may be omitted in a particular implementation within the scope of the present disclosure, and some illustrated features may not be required for implementation of all embodiments. In some examples, the process 800 may be carried out by the UE 700 illustrated in FIG. 7. In some examples, the process 800 may be carried out by any suitable apparatus or means for carrying out the functions or algorithm described below.

At block 802, the UE may operate in a multi-radio dual connectivity (MR-DC) mode with connections established to a source master node and a source secondary node. For example, the communication management circuitry 742 shown and described above in connection with FIG. 7 may provide means for operating in the MR-DC.

At block 804, in some aspects, the UE may receive, from the source master node, a conditional PSCell configuration indicating the one or more target PSCells. For example, the evaluation process circuitry 740 shown and described above in connection with FIG. 7 may provide means for receiving the conditional PSCell configuration. In an aspect, the conditional PSCell configuration includes a conditional PSCell addition or a conditional PSCell change configuration. In an aspect, the conditional PSCell configuration includes the one or more execution conditions. In an aspect, the conditional PSCell configuration is received via a radio resource control (RRC) reconfiguration message.

At block 806, the UE may evaluate one or more link qualities between the UE and one or more target primary secondary cell group (SCG) cells (PSCells) respectively associated with one or more target secondary nodes. For example, the evaluation process circuitry 740 shown and described above in connection with FIG. 7 may provide means for evaluating the one or more link qualities.

At block 808, the UE may select a target PSCell from the one or more target PSCells based on the one or more link qualities and one or more execution conditions respectively associated with the one or more target PSCells of the one or more target secondary nodes. For example, the evaluation process circuitry 740 shown and described above in connection with FIG. 7 may provide means for selecting the target PSCell.

At block 810, the UE may initiate a conditional execution procedure to connect to a target secondary node corresponding to the selected target PSCell. For example, the communication management circuitry 742 shown and described above in connection with FIG. 7 may provide means for initiating the conditional execution procedure.

At block 812, in some aspects, the UE may transmit, to the source master node, an radio resource control (RRC) reconfiguration complete message to indicate the selected target PSCell when the conditional execution procedure is initiated. For example, the communication management circuitry 742 shown and described above in connection with FIG. 7 may provide means for transmitting the RRC reconfiguration complete message.

At block 814, in some aspects, the UE may perform, responsive to the source SCG state being an activated state, the random access channel (RACH) procedure on the selected target PSCell. For example, the communication management circuitry 742 shown and described above in connection with FIG. 7 may provide means for performing the RACH procedure.

FIG. 8B is a flow chart illustrating an exemplary process 850 for wireless communication by a user equipment (UE) continuing from the exemplary process 800 of FIG. 8A, in accordance with some aspects. As described below, some or all illustrated features may be omitted in a particular implementation within the scope of the present disclosure, and some illustrated features may not be required for implementation of all embodiments. In some examples, the process 850 may be carried out by the UE 700 illustrated in FIG. 7. In some examples, the process 850 may be carried out by any suitable apparatus or means for carrying out the functions or algorithm described below.

Responsive to a source SCG state corresponding to a source PSCell of the source secondary node being a deactivated state, the UE may perform either, at block 852, changing an SCG state at the UE to an activated state and perform a random access channel (RACH) procedure on the selected target PSCell to perform the conditional execution procedure to connect to the selected target PSCell, or at block 854, maintaining the SCG state at the UE as the deactivated state without performing a RACH procedure on the selected target PSCell. For example, the communication management circuitry 742 and the SCG state management circuitry 744 shown and described above in connection with FIG. 7 may provide means for performing either: changing the SCG state at the UE to an activated state and performing the RACH procedure, or maintaining the SCG state at the UE as the deactivated state. In an aspect, the source master node indicates to a target secondary node associated with the selected target PSCell that a source SCG state corresponding to the source secondary node is in a deactivated state during the conditional execution procedure.

At block 856, in some aspects where the SCG state at the UE is set to the activated state and the RACH procedure is performed on the selected target PSCell, in conjunction with the conditional execution procedure, the UE may receive, from the source master node or the target secondary node corresponding to the selected target PSCell, a correction indication to correct the SCG state at the UE after connecting to the selected target PSCell. For example, the communication management circuitry 742 shown and described above in connection with FIG. 7 may provide means for receiving the correction indication.

At block 858, in some aspects, the UE may change the SCG state at the UE to the deactivated state based on the correction indication. For example, the SCG state management circuitry 744 shown and described above in connection with FIG. 7 may provide means for changing the SCG state at the UE.

In one configuration, the UE 700 for wireless communication includes means for operating the UE in a multi-radio dual connectivity (MR-DC) mode with connections established to a source master node and a source secondary node, means for evaluating one or more link qualities between the UE and one or more target primary secondary cell group (SCG) cells (PSCells) respectively associated with one or more target secondary nodes, means for selecting a target PSCell from the one or more target PSCells based on the one or more link qualities and one or more execution conditions respectively associated with the one or more target PSCells of the one or more target secondary nodes, means for initiating a conditional execution procedure to connect to a target secondary node corresponding to the selected target PSCell, and means for, responsive to a source SCG state corresponding to a source PSCell of the source secondary node being a deactivated state, performing either (a) changing an SCG state at the UE to an activated state and performing a random access channel (RACH) procedure on the selected target PSCell to perform the conditional execution procedure to connect to the selected target PSCell, or (b) maintaining the SCG state at the UE as the deactivated state without performing a RACH procedure on the selected target PSCell.

In some aspects, the UE 700 may further include means for receiving, from a source master node, a conditional PSCell configuration indicating the one or more target PSCells. In some aspects, the UE 700 may further include responsive to the source SCG state being an activated state, means for performing the random access channel (RACH) procedure on the selected target PSCell. In some aspects, the UE 700 may further include means for transmitting, to a source master node, an radio resource control (RRC) reconfiguration complete message to indicate the selected target PSCell when the conditional execution is initiated. In some aspects, the UE 700 may further include. In some aspects, where the SCG state at the UE is set to the activated state and the RACH procedure is performed on the selected target PSCell, upon the execution procedure, the UE 700 may further include means for receiving, from a source master node or the target secondary node corresponding to the selected target PSCell, a correction indication to correct the SCG state at the UE after connecting to the selected target PSCell, and means for changing the SCG state at the UE back to the deactivated state based on the correction indication.

In one aspect, the aforementioned means may be the processor(s) 704 shown in FIG. 7 configured to perform the functions recited by the aforementioned means. In another aspect, the aforementioned means may be a circuit or any apparatus configured to perform the functions recited by the aforementioned means.

Of course, in the above examples, the circuitry included in the processor 704 is merely provided as an example, and other means for carrying out the described functions may be included within various aspects of the present disclosure, including but not limited to the instructions stored in the computer-readable storage medium 706, or any other suitable apparatus or means described in any one of the FIGS. 1, 2, 4, 5 and/or 6, and utilizing, for example, the processes and/or algorithms described herein in relation to FIG. 7.

Figure 9:
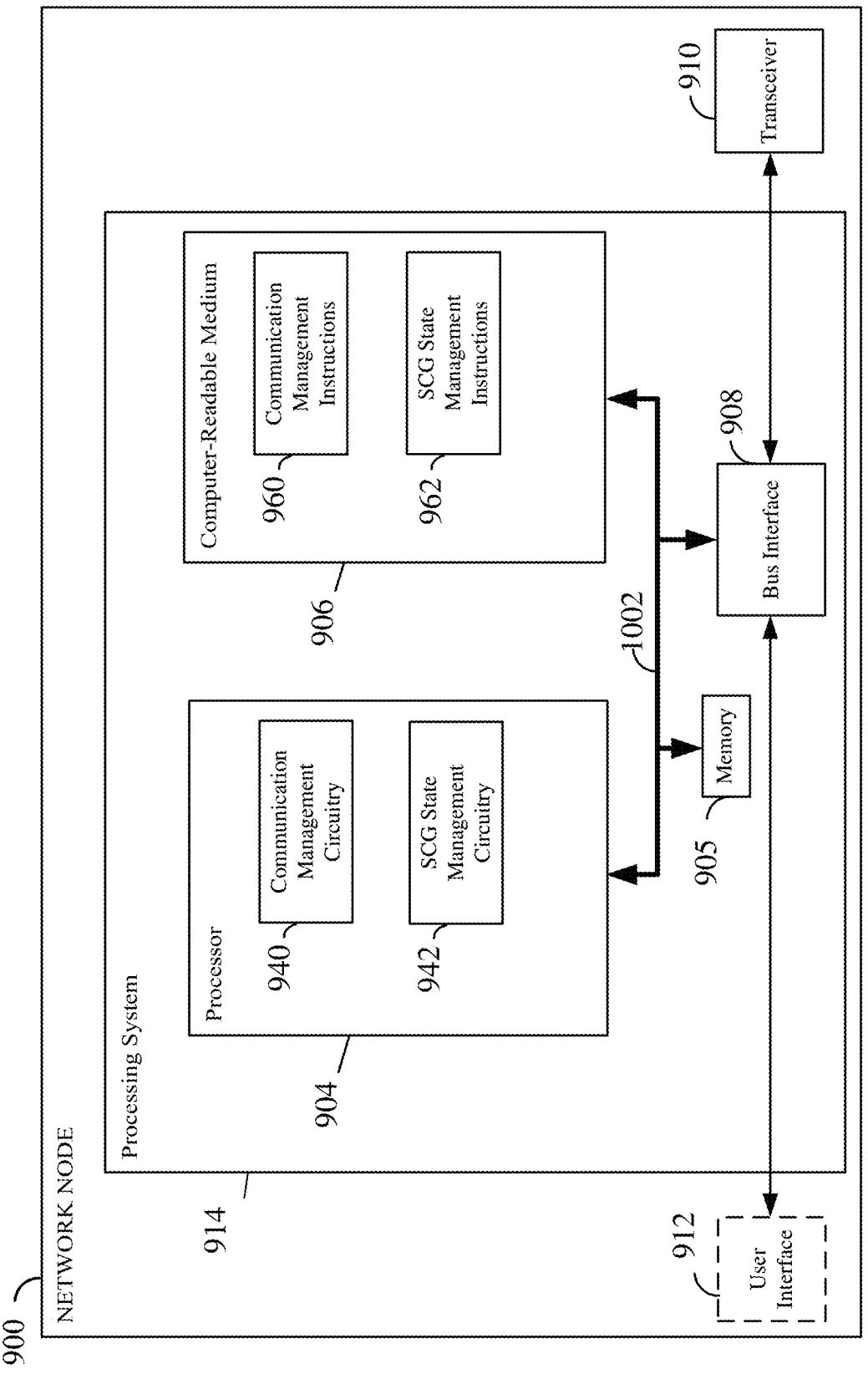
FIG. 9 is a block diagram conceptually illustrating an example of a hardware implementation for a network node according to some aspects.

FIG. 9 is a block diagram illustrating an example of a hardware implementation for a network node 900 employing a processing system 914. In one example, the network node 900 may be master node as illustrated in any one or more of FIGS. 4, 5, and/or 6. In one example, the network node 900 may be a secondary node as illustrated in any one or more of FIGS. 4, 5, and/or 6.

The network node 900 may be implemented with a processing system 914 that includes one or more processors 904. Examples of processors 904 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the network node 900 may be configured to perform any one or more of the functions described herein. That is, the processor 904, as utilized in a network node 900, may be used to implement any one or more of the processes and procedures described below and illustrated in FIG. 10-12.

In this example, the processing system 914 may be implemented with a bus architecture, represented generally by the bus 902. The bus 902 may include any number of interconnecting buses and bridges depending on the specific application of the processing system 914 and the overall design constraints. The bus 902 communicatively couples together various circuits including one or more processors (represented generally by the processor 904), a memory 905, and computer-readable media (represented generally by the computer-readable storage medium 906). The bus 902 may also link various other circuits such as timing sources, peripherals, voltage regulators, and power management circuits, which are well known in the art, and therefore, will not be described any further. A bus interface 908 provides an interface between the bus 902 and a transceiver 910. The transceiver 910 provides a communication interface or means for communicating with various other apparatus over a transmission medium. Depending upon the nature of the apparatus, a user interface 912 (e.g., keypad, display, speaker, microphone, joystick) may also be provided. Of course, such a user interface 912 is optional, and may be omitted in some examples, such as a base station.

In some aspects of the disclosure, the processor 904 may include communication management circuitry 940 configured for various functions, including, for example, operating in a multi-radio dual connectivity (MR-DC) mode with connections established with a user equipment (UE) and a source secondary node. For example, the communication management circuitry 940 may be configured to implement one or more of the functions described below in relation to FIGS. 10 and 11, including, e.g., blocks 1002 and 1102.

In some aspects, the communication management circuitry 940 may be configured for various functions, including, for example, transmitting, to the UE, a conditional PSCell addition or a conditional PSCell change configuration indicating the one or more target PSCells. For example, the communication management circuitry 940 may be configured to implement one or more of the functions described below in relation to FIGS. 10 and 11, including, e.g., blocks 1004 and 1104.

In some aspects, the communication management circuitry 940 may be configured for various functions, including, for example, transmitting, to the UE, an SCG change indication indicating that the source SCG state has changed. For example, the communication management circuitry 940 may be configured to implement one or more of the functions described below in relation to FIG. 10, including, e.g., block 1008.

In some aspects, the communication management circuitry 940 may be configured for various functions, including, for example, refraining from notifying the one or more target secondary nodes that the changing of the source SCG state has occurred during the evaluation process. For example, the communication management circuitry 940 may be configured to implement one or more of the functions described below in relation to FIG., including, e.g., block 1012.

In some aspects, the communication management circuitry 940 may be configured for various functions, including, for example, receiving, from the UE, a time elapsed between a past UE reception of conditional PSCell configurations and a past UE execution of at least one of a conditional PSCell addition or a conditional PSCell change. For example, the communication management circuitry 940 may be configured to implement one or more of the functions described below in relation to FIG. 10, including, e.g., block 1014.

In some aspects, the communication management circuitry 940 may be configured for various functions, including, for example, transmitting, to the one or more target secondary nodes, at least one of the time elapsed or a traffic pattern of data radio bearers (DRBs) utilizing SCG resources. For example, the communication management circuitry 940 may be configured to implement one or more of the functions described below in relation to FIG. 10, including, e.g., block 1016.

In some aspects, the communication management circuitry 940 may be configured for various functions, including, for example, initiating a conditional PSCell addition or a conditional PSCell change configuration modification procedure with the one or more target secondary nodes in response to determining that the changing of the source SCG state has occurred during the evaluation process, wherein the conditional PSCell addition or a conditional PSCell change configuration modification procedure comprises communicating the changed source SCG state to the one or more target secondary nodes. For example, the communication management circuitry 940 may be configured to implement one or more of the functions described below in relation to FIG. 11, including, e.g., block 1110.

In some aspects, the communication management circuitry 940 may be configured for various functions, including, for example, receiving, from the one or more target secondary nodes, one or more updated SCG configurations respectively corresponding to the one or more target PSCells, the one or more updated SCG configurations including one or more updated SCG states corresponding to the one or more target PSCells, respectively. For example, the communication management circuitry 940 may be configured to implement one or more of the functions described below in relation to FIG. 11, including, e.g., block 1152.

In some aspects, the communication management circuitry 940 may be configured for various functions, including, for example, transmitting, to the UE, the one or more updated SCG configurations. For example, the communication management circuitry 940 may be configured to implement one or more of the functions described below in relation to FIG. 11, including, e.g., block 1154.

In some aspects, the communication management circuitry 940 may be configured for various functions, including, for example, receiving, from the UE, a time elapsed between a past UE reception of conditional PSCell configurations and a past UE execution of at least one of a conditional PSCell addition or a conditional PSCell change. For example, the communication management circuitry 940 may be configured to implement one or more of the functions described below in relation to FIG. 11, including, e.g., block 1156.

In some aspects, the communication management circuitry 940 may be configured for various functions, including, for example, transmitting, to the one or more target secondary nodes, at least one of the time elapsed or a traffic pattern of data radio bearers (DRBs) utilizing SCG resources. For example, the communication management circuitry 940 may be configured to implement one or more of the functions described below in relation to FIG. 11, including, e.g., block 1158.

In some aspects, the communication management circuitry 940 may be configured for various functions, including, for example, communicating with a source master node of a user equipment (UE) during a preparation procedure to determine that the network node is a target secondary node for potential connection to the UE to operate in a multi-radio dual connectivity (MR-DC) mode. For example, the communication management circuitry 940 may be configured to implement one or more of the functions described below in relation to FIG. 12, including, e.g., block 1202.

In some aspects, the communication management circuitry 940 may be configured for various functions, including, for example, receiving, during the preparation procedure, at least one of: a time elapsed between a past UE reception of conditional primary secondary cell (PSCell) configurations and a past UE execution of at least one of a time elapsed between a past UE reception of conditional primary secondary cell (PSCell) configurations and a past UE execution of at least one of a conditional PSCell addition or a conditional PSCell change, or a traffic pattern of data radio bearers (DRBs) utilizing SCG resources. For example, the communication management circuitry 940 may be configured to implement one or more of the functions described below in relation to FIG. 12, including, e.g., block 1204.

In some aspects, the communication management circuitry 940 may be configured for various functions, including, for example, transmitting the SCG state for the target PSCell of the network node to the source master node configured to forward the SCG state for the target PSCell of the network node to the UE. For example, the communication management circuitry 940 may be configured to implement one or more of the functions described below in relation to FIG. 12, including, e.g., block 1208.

In some aspects of the disclosure, the processor 904 may include SCG state management circuitry 942 configured for various functions, including, for example, changing a source secondary cell group (SCG) state associated with a source primary SCG cell (PSCell) of the source secondary node based on at least one of a request from the UE to change the source SCG state or a network condition. For example, the SCG state management circuitry 942 may be configured to implement one or more of the functions described below in relation to FIGS. 10 and 11, including, e.g., blocks 1006 and 1106.

In some aspects, the SCG state management circuitry 942 may be configured for various functions, including, for example, determining that the changing of the source SCG state has occurred during an evaluation process by the UE, wherein the evaluation process comprises evaluation of one or more link qualities between the UE and one or more target PSCells respectively associated with one or more target secondary nodes to select a target PSCell from the one or more target PSCells. For example, the SCG state management circuitry 942 may be configured to implement one or more of the functions described below in relation to FIGS. 10 and 11, including, e.g., blocks 1010 and 1108.

In some aspects, the SCG state management circuitry 942 may be configured for various functions, including, for example, determining an SCG state for a target PSCell of the network node based on the at least one of the time elapsed or the traffic pattern of the DRBs. For example, the SCG state management circuitry 942 may be configured to implement one or more of the functions described below in relation to FIG. 12, including, e.g., block 1206.

The processor 904 is responsible for managing the bus 902 and general processing, including the execution of software stored on the computer-readable storage medium 906. The software, when executed by the processor 904, causes the processing system 914 to perform the various functions described below for any particular apparatus. The computer-readable storage medium 906 and the memory 905 may also be used for storing data that is manipulated by the processor 904 when executing software.

One or more processors 904 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable storage medium 906. The computer-readable storage medium 906 may be a non-transitory computer-readable storage medium. A non-transitory computer-readable storage medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable storage medium 906 may reside in the processing system 914, external to the processing system 914, or distributed across multiple entities including the processing system 914. The computer-readable storage medium 906 may be embodied in a computer program product. By way of example, a computer program product may include a computer-readable storage medium in packaging materials. Those skilled in the art will recognize how best to implement the described functionality presented throughout this disclosure depending on the particular application and the overall design constraints imposed on the overall system.

In some aspects of the disclosure, the computer-readable storage medium 906 may include communication management software/instructions 960 configured for various functions, including, for example, operating in a multi-radio dual connectivity (MR-DC) mode with connections established with a user equipment (UE) and a source secondary node. For example, the communication management software/instructions 960 may be configured to implement one or more of the functions described below in relation to FIGS. 10 and 11, including, e.g., blocks 1002 and 1102.

In some aspects, the communication management software/instructions 960 may be configured for various functions, including, for example, transmitting, to the UE, a conditional PSCell addition or a conditional PSCell change configuration indicating the one or more target PSCells. For example, the communication management software/instructions 960 may be configured to implement one or more of the functions described below in relation to FIGS. 10 and 11, including, e.g., blocks 1004 and 1104.

In some aspects, the communication management software/instructions 960 may be configured for various functions, including, for example, transmitting, to the UE, an SCG change indication indicating that the source SCG state has changed. For example, the communication management software/instructions 960 may be configured to implement one or more of the functions described below in relation to FIG. 10, including, e.g., block 1008.

In some aspects, the communication management software/instructions 960 may be configured for various functions, including, for example, refraining from notifying the one or more target secondary nodes that the changing of the source SCG state has occurred during the evaluation process. For example, the communication management software/instructions 960 may be configured to implement one or more of the functions described below in relation to FIG., including, e.g., block 1012.

In some aspects, the communication management software/instructions 960 may be configured for various functions, including, for example, receiving, from the UE, a time elapsed between a past UE reception of conditional PSCell configurations and a past UE execution of at least one of a conditional PSCell addition or a conditional PSCell change. For example, the communication management software/instructions 960 may be configured to implement one or more of the functions described below in relation to FIG. 10, including, e.g., block 1014.

In some aspects, the communication management software/instructions 960 may be configured for various functions, including, for example, transmitting, to the one or more target secondary nodes, at least one of the time elapsed or a traffic pattern of data radio bearers (DRBs) utilizing SCG resources. For example, the communication management software/instructions 960 may be configured to implement one or more of the functions described below in relation to FIG. 10, including, e.g., block 1016.

In some aspects, the communication management software/instructions 960 may be configured for various functions, including, for example, initiating a conditional PSCell addition or a conditional PSCell change configuration modification procedure with the one or more target secondary nodes in response to determining that the changing of the source SCG state has occurred during the evaluation process, wherein the conditional PSCell addition or a conditional PSCell change configuration modification procedure comprises communicating the changed source SCG state to the one or more target secondary nodes. For example, the communication management software/instructions 960 may be configured to implement one or more of the functions described below in relation to FIG. 11, including, e.g., block 1110.

In some aspects, the communication management software/instructions 960 may be configured for various functions, including, for example, receiving, from the one or more target secondary nodes, one or more updated SCG configurations respectively corresponding to the one or more target PSCells, the one or more updated SCG configurations including one or more updated SCG states corresponding to the one or more target PSCells, respectively. For example, the communication management software/instructions 960 may be configured to implement one or more of the functions described below in relation to FIG. 11, including, e.g., block 1152.

In some aspects, the communication management software/instructions 960 may be configured for various functions, including, for example, transmitting, to the UE, the one or more updated SCG configurations. For example, the communication management software/instructions 960 may be configured to implement one or more of the functions described below in relation to FIG. 11, including, e.g., block 1154.

In some aspects, the communication management software/instructions 960 may be configured for various functions, including, for example, receiving, from the UE, a time elapsed between a past UE reception of conditional PSCell configurations and a past UE execution of at least one of a conditional PSCell addition or a conditional PSCell change. For example, the communication management software/instructions 960 may be configured to implement one or more of the functions described below in relation to FIG. 11, including, e.g., block 1156.

In some aspects, the communication management software/instructions 960 may be configured for various functions, including, for example, transmitting, to the one or more target secondary nodes, at least one of the time elapsed or a traffic pattern of data radio bearers (DRBs) utilizing SCG resources. For example, the communication management software/instructions 960 may be configured to implement one or more of the functions described below in relation to FIG. 11, including, e.g., block 1158.

In some aspects, the communication management software/instructions 960 may be configured for various functions, including, for example, communicating with a source master node of a user equipment (UE) during a preparation procedure to determine that the network node is a target secondary node for potential connection to the UE to operate in a multi-radio dual connectivity (MR-DC) mode. For example, the communication management software/instructions 960 may be configured to implement one or more of the functions described below in relation to FIG. 12, including, e.g., block 1202.

In some aspects, the communication management software/instructions 960 may be configured for various functions, including, for example, receiving, during the preparation procedure, at least one of: a time elapsed between a past UE reception of conditional primary secondary cell (PSCell) configurations and a past UE execution of at least one of a time elapsed between a past UE reception of conditional primary secondary cell (PSCell) configurations and a past UE execution of at least one of a conditional PSCell addition or a conditional PSCell change, or a traffic pattern of data radio bearers (DRBs) utilizing SCG resources. For example, the communication management software/instructions 960 may be configured to implement one or more of the functions described below in relation to FIG. 12, including, e.g., block 1204.

In some aspects, the communication management software/instructions 960 may be configured for various functions, including, for example, transmitting the SCG state for the target PSCell of the network node to the source master node configured to forward the SCG state for the target PSCell of the network node to the UE. For example, the communication management software/instructions 960 may be configured to implement one or more of the functions described below in relation to FIG. 12, including, e.g., block 1208.

In some aspects of the disclosure, the computer-readable storage medium 906 may include SCG state management software/instructions 962 configured for various functions, including, for example, changing a source secondary cell group (SCG) state associated with a source primary SCG cell (PSCell) of the source secondary node based on at least one of a request from the UE to change the source SCG state or a network condition. For example, the SCG state management software/instructions 962 may be configured to implement one or more of the functions described below in relation to FIGS. 10 and 11, including, e.g., blocks 1006 and 1106.

In some aspects, the SCG state management software/instructions 962 may be configured for various functions, including, for example, determining that the changing of the source SCG state has occurred during an evaluation process by the UE, wherein the evaluation process comprises evaluation of one or more link qualities between the UE and one or more target PSCells respectively associated with one or more target secondary nodes to select a target PSCell from the one or more target PSCells. For example, the SCG state management software/instructions 962 may be configured to implement one or more of the functions described below in relation to FIGS. 10 and 11, including, e.g., blocks 1010 and 1108.

In some aspects, the SCG state management software/instructions 962 may be configured for various functions, including, for example, determining an SCG state for a target PSCell of the network node based on the at least one of the time elapsed or the traffic pattern of the DRBs. For example, the SCG state management software/instructions 962 may be configured to implement one or more of the functions described below in relation to FIG. 12, including, e.g., block 1206.

Figure 10:
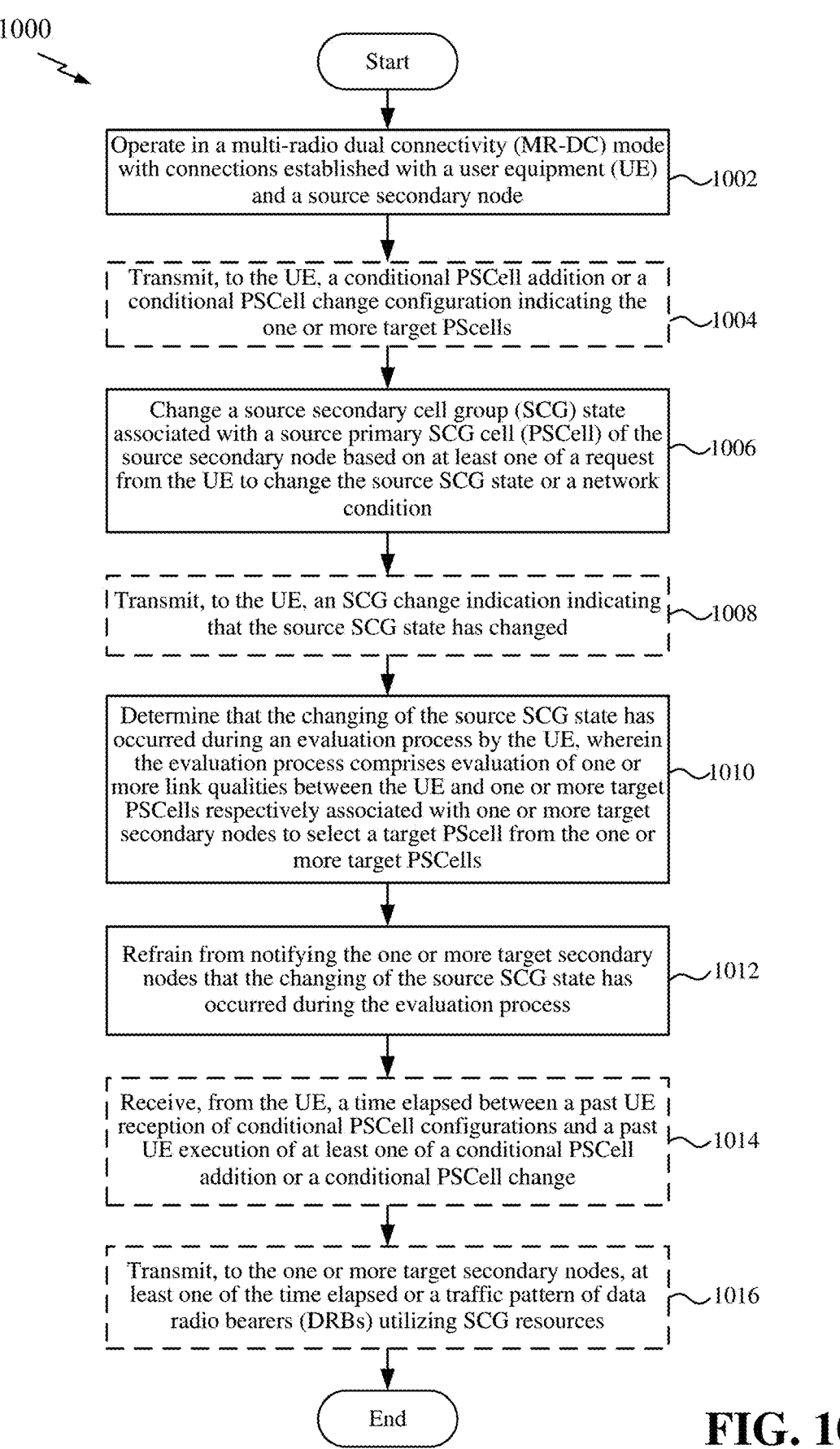
FIG. 10 is a flow chart illustrating an exemplary process for wireless communication according to some aspects.

FIG. 10 is a flow chart illustrating an exemplary process 1000 for wireless communication in accordance with some aspects of the present disclosure. As described below, some or all illustrated features may be omitted in a particular implementation within the scope of the present disclosure, and some illustrated features may not be required for implementation of all embodiments. In some examples, the process 900 may be carried out by the network node 900 illustrated in FIG. 9. In some aspects, the network node performing the process 1000 may be an S-MN. In some examples, the process 900 may be carried out by any suitable apparatus or means for carrying out the functions or algorithm described below.

At block 1002, the network node may operate in a multi-radio dual connectivity (MR-DC) mode with connections established with a user equipment (UE) and a source secondary node. For example, the communication management circuitry 940 shown and described above in connection with FIG. 9 may provide means for operating in the MR-DC.

At block 1004, in some aspects, the network node may transmit, to the UE, a conditional PSCell addition or a conditional PSCell change configuration indicating the one or more target PSCells. For example, the communication management circuitry 940 shown and described above in connection with FIG. 9 may provide means for transmitting the conditional PSCell addition or the conditional PSCell change configuration.

At block 1006, the network node may change a source secondary cell group (SCG) state associated with a source primary SCG cell (PSCell) of the source secondary node based on at least one of a request from the UE to change the source SCG state or a network condition. For example, the SCG state management circuitry 942 shown and described above in connection with FIG. 9 may provide means for changing the source SCG.

At block 1008, in some aspects, the network node may transmit, to the UE, an SCG change indication indicating that the source SCG state has changed. For example, the communication management circuitry 940 shown and described above in connection with FIG. 9 may provide means for transmitting the SCG change indication.

At block 1010, the network node may determine that the changing of the source SCG state has occurred during an evaluation process by the UE, wherein the evaluation process comprises evaluation of one or more link qualities between the UE and one or more target PSCells respectively associated with one or more target secondary nodes to select a target PSCell from the one or more target PSCells. For example, the SCG state management circuitry 942 shown and described above in connection with FIG. 9 may provide means for determining that the changing of the source SCG state has occurred during the evaluation process.

At block 1012, the network node may refrain from notifying the one or more target secondary nodes that the changing of the source SCG state has occurred during the evaluation process. For example, the communication management circuitry 940 shown and described above in connection with FIG. 9 may provide means for refraining refrain from notifying the one or more target secondary nodes.

At block 1014, in some aspects, the network node may receive, from the UE, a time elapsed between a past UE reception of conditional PSCell configurations and a past UE execution of at least one of a conditional PSCell addition or a conditional PSCell change. For example, the communication management circuitry 940 shown and described above in connection with FIG. 9 may provide means for receiving the time elapsed.

At block 1016, in some aspects, the network node may transmit, to the one or more target secondary nodes, at least one of the time elapsed or a traffic pattern of data radio bearers (DRBs) utilizing SCG resources. For example, the communication management circuitry 940 shown and described above in connection with FIG. 9 may provide means for transmitting the at least one of the time elapsed or the traffic pattern.

In one configuration, the network node 900 for wireless communication includes means for operating in a multi-radio dual connectivity (MR-DC) mode with connections established with a user equipment (UE) and a source secondary node, means for changing a source secondary cell group (SCG) state associated with a source primary SCG cell (PSCell) of the source secondary node based on at least one of a request from the UE to change the source SCG state or a network condition, means for determining that the changing of the source SCG state has occurred during an evaluation process by the UE, wherein the evaluation process comprises evaluation of one or more link qualities between the UE and one or more target PSCells respectively associated with one or more target secondary nodes to select a target PSCell from the one or more target PSCells, and means for refraining from notifying the one or more target secondary nodes that the changing of the source SCG state has occurred during the evaluation process. In some aspects, the network node 900 may further include means for transmitting, to the UE, a conditional PSCell addition or a conditional PSCell change configuration indicating the one or more target PScells In one aspect, the aforementioned means may be the processor(s) 904 shown in FIG. 9 configured to perform the functions recited by the aforementioned means. In another aspect, the aforementioned means may be a circuit or any apparatus configured to perform the functions recited by the aforementioned means.

FIG. 11A is a flow chart illustrating an exemplary process 1100 for wireless communication in accordance with some aspects of the present disclosure. As described below, some or all illustrated features may be omitted in a particular implementation within the scope of the present disclosure, and some illustrated features may not be required for implementation of all embodiments. In some examples, the process 900 may be carried out by the network node 900 illustrated in FIG. 9. In some aspects, the network node performing the process 1100 may be an S-MN. In some examples, the process 900 may be carried out by any suitable apparatus or means for carrying out the functions or algorithm described below.

At block 1102, in some aspects, the network node may operate in a multi-radio dual connectivity (MR-DC) mode with connections established with a user equipment (UE) and a source secondary node. For example, the communication management circuitry 940 shown and described above in connection with FIG. 9 may provide means for operating in the MR-DC.

At block 1104, in some aspects, the network node may transmit, to the UE, a conditional PSCell addition or a conditional PSCell change configuration indicating the one or more target PSCells. For example, the communication management circuitry 940 shown and described above in connection with FIG. 9 may provide means for transmitting the conditional PSCell addition or the conditional PSCell change configuration.

At block 1106, the network node may change a source secondary cell group (SCG) state associated with a source primary SCG cell (PSCell) of the source secondary node based on at least one of a request from the UE to change the source SCG state or a network condition. For example, the SCG state management circuitry 942 shown and described above in connection with FIG. 9 may provide means for changing the source SCG.

At block 1108, the network node may determine that the changing of the source SCG state has occurred during an evaluation process by the UE, wherein the evaluation process comprises evaluation of one or more link qualities between the UE and one or more target PSCells respectively associated with one or more target secondary nodes to select a target PSCell from the one or more target PSCells. For example, the SCG state management circuitry 942 shown and described above in connection with FIG. 9 may provide means for determining that the changing of the source SCG state has occurred during the evaluation process.

At block 1110, the network node may initiate a conditional PSCell addition or a conditional PSCell change configuration modification procedure with the one or more target secondary nodes in response to determining that the changing of the source SCG state has occurred during the evaluation process, wherein the conditional PSCell addition or a conditional PSCell change configuration modification procedure comprises communicating the changed source SCG state to the one or more target secondary nodes. For example, the communication management circuitry 940 shown and described above in connection with FIG. 9 may provide means for initiating the conditional PSCell addition or the conditional PSCell change configuration modification procedure.

FIG. 11B is a flow chart illustrating an exemplary process 1150 for wireless communication by a user equipment (UE) continuing from the exemplary process 1100 of FIG. 11A, in accordance with some aspects. As described below, some or all illustrated features may be omitted in a particular implementation within the scope of the present disclosure, and some illustrated features may not be required for implementation of all embodiments. In some examples, the process 1150 may be carried out by the network node 900 illustrated in FIG. 9. In some examples, the process 1150 may be carried out by any suitable apparatus or means for carrying out the functions or algorithm described below.

At block 1152, in some aspects, the network node may receive, from the one or more target secondary nodes, one or more updated SCG configurations respectively corresponding to the one or more target PSCells, the one or more updated SCG configurations including one or more updated SCG states corresponding to the one or more target PSCells, respectively. For example, the communication management circuitry 940 shown and described above in connection with FIG. 9 may provide means for receiving the one or more updated SCG configurations.

At block 1154, in some aspects, the network node may transmit, to the UE, the one or more updated SCG configurations. For example, the communication management circuitry 940 shown and described above in connection with FIG. 9 may provide means for transmitting the one or more updated SCG configurations.

At block 1156, in some aspects, the network node may receive, from the UE, a time elapsed between a past UE reception of conditional PSCell configurations and a past UE execution of at least one of a conditional PSCell addition or a conditional PSCell change. For example, the communication management circuitry 940 shown and described above in connection with FIG. 9 may provide means for receiving the time elapsed.

At block 1158, in some aspects, the network node may transmit, to the one or more target secondary nodes, at least one of the time elapsed or a traffic pattern of data radio bearers (DRBs) utilizing SCG resources. For example, the communication management circuitry 940 shown and described above in connection with FIG. 9 may provide means for transmitting the at least one of the time elapsed or the traffic pattern.

In one configuration, the network node 900 for wireless communication includes means for operating in a multi-radio dual connectivity (MR-DC) mode with connections established with a user equipment (UE) and a source secondary node, means for changing a source secondary cell group (SCG) state associated with a source primary SCG cell (PSCell) of the source secondary node based on at least one of a request from the UE to change the source SCG state or a network condition, means for determining that the changing of the source SCG state has occurred during an evaluation process by the UE, the evaluation process evaluating one or more link qualities between the UE and one or more target PSCells respectively associated with one or more target secondary nodes to select a target PSCell from the one or more target PSCells, and means for initiating a conditional PSCell addition or a conditional PSCell change configuration modification procedure with the one or more target secondary nodes in response to determining that the changing of the source SCG state has occurred during the evaluation process, wherein the conditional PSCell addition or a conditional PSCell change configuration modification procedure comprises communicating the changed source SCG state to the one or more target secondary nodes.

In some aspects, the network node 900 may further include receiving, from the one or more target secondary nodes, one or more updated SCG configurations respectively corresponding to the one or more target PSCells, the one or more updated SCG configurations including one or more updated SCG states corresponding to the one or more target PSCells, respectively, and means for transmitting, to the UE, the one or more updated SCG configurations. In some aspects, the network node 900 may further include means for receiving, from the UE, a time elapsed between a past UE reception of conditional PSCell configurations and a past UE execution of at least one of a conditional PSCell addition or a conditional PSCell change, and means for transmitting, to the one or more target secondary nodes, at least one of the time elapsed or a traffic pattern of data radio bearers (DRBs) utilizing SCG resources.

In one aspect, the aforementioned means may be the processor(s) 904 shown in FIG. 9 configured to perform the functions recited by the aforementioned means. In another aspect, the aforementioned means may be a circuit or any apparatus configured to perform the functions recited by the aforementioned means.

FIG. 12 is a flow chart illustrating an exemplary process 1200 for wireless communication in accordance with some aspects of the present disclosure. As described below, some or all illustrated features may be omitted in a particular implementation within the scope of the present disclosure, and some illustrated features may not be required for implementation of all embodiments. In some examples, the process 900 may be carried out by the network node 900 illustrated in FIG. 9. In some aspects, the network node performing the process 1200 may be a target SN. In some examples, the process 900 may be carried out by any suitable apparatus or means for carrying out the functions or algorithm described below.

At block 1202, the network node may communicate with a source master node of a user equipment (UE) during a preparation procedure to determine that the network node is a target secondary node for potential connection to the UE to operate in a multi-radio dual connectivity (MR-DC) mode. For example, the communication management circuitry 940 shown and described above in connection with FIG. 9 may provide means for communicating with the source master node.

At block 1204, the network node may receive, during the preparation procedure, at least one of: a time elapsed between a past UE reception of conditional primary secondary cell (PSCell) configurations and a past UE execution of at least one of a time elapsed between a past UE reception of conditional primary secondary cell (PSCell) configurations and a past UE execution of at least one of a conditional PSCell addition or a conditional PSCell change, or a traffic pattern of data radio bearers (DRBs) utilizing SCG resources. For example, the communication management circuitry 940 shown and described above in connection with FIG. 9 may provide means for receiving at least one of the time elapsed or the traffic pattern.

At block 1206, the network node may determine an SCG state for a target PSCell of the network node based on the at least one of the time elapsed or the traffic pattern of the DRBs. For example, the SCG state management circuitry 942 shown and described above in connection with FIG. 9 may provide means for determining the SCG state.

At block 1208, the network node may transmit the SCG state for the target PSCell of the network node to the source master node configured to forward the SCG state for the target PSCell of the network node to the UE. For example, the communication management circuitry 940 shown and described above in connection with FIG. 9 may provide means for transmitting the SCG state.

In one configuration, the network node 900 for wireless communication includes means for communicating with a source master node of a user equipment (UE) during a preparation procedure to determine that the network node is a target secondary node for potential connection to the UE to operate in a multi-radio dual connectivity (MR-DC) mode, means for receiving, during the preparation procedure, at least one of: a time elapsed between a past UE reception of conditional primary secondary cell (PSCell) configurations and a past UE execution of at least one of a conditional PSCell addition or a conditional PSCell change, or a traffic pattern of data radio bearers (DRBs) utilizing SCG resources, and means for determining an SCG state for a target PSCell of the network node based on the at least one of the time elapsed or the traffic pattern of the DRBs. In some aspects, the network node 900 may further include means for transmitting the SCG state for the target PSCell of the network node to the source master node configured to forward the SCG state for the target PSCell of the network node to the UE.

In one aspect, the aforementioned means may be the processor(s) 904 shown in FIG. 9 configured to perform the functions recited by the aforementioned means. In another aspect, the aforementioned means may be a circuit or any apparatus configured to perform the functions recited by the aforementioned means.

Of course, in the above examples, the circuitry included in the processor 904 is merely provided as an example, and other means for carrying out the described functions may be included within various aspects of the present disclosure, including but not limited to the instructions stored in the computer-readable storage medium 906, or any other suitable apparatus or means described in any one of the FIGS. 4, 5, and/or 6, and utilizing, for example, the processes and/or algorithms described herein in relation to FIGS. 10, 11 and/or 12.

The following provides an overview of several aspects of the present disclosure.

Aspect 1: A method of wireless communication by a user equipment (UE), comprising: operating the UE in a multi-radio dual connectivity (MR-DC) mode with connections established to a source master node and a source secondary node; evaluating one or more link qualities between the UE and one or more target primary secondary cell group (SCG) cells (PSCells) respectively associated with one or more target secondary nodes; selecting a target PSCell from the one or more target PSCells based on the one or more link qualities and one or more execution conditions respectively associated with the one or more target PSCells of the one or more target secondary nodes; initiating a conditional execution procedure to connect to a target secondary node corresponding to the selected target PSCell; and responsive to a source SCG state corresponding to a source PSCell of the source secondary node being a deactivated state, performing either: (a) changing an SCG state at the UE to an activated state and performing a random access channel (RACH) procedure on the selected target PSCell to perform the conditional execution procedure to connect to the selected target PSCell, or (b) maintaining the SCG state at the UE as the deactivated state without performing a RACH procedure on the selected target PSCell.

Aspect 2: The method of aspect 1, further comprising: receiving, from the source master node, a conditional PSCell configuration indicating the one or more target PSCells, wherein the evaluating the one or more link qualities is performed on the one or more target PSCells indicated in the conditional PSCell configuration.

Aspect 3: The method of aspect 2, wherein the conditional PSCell configuration includes a conditional PSCell addition or a conditional PSCell change configuration.

Aspect 4: The method of aspect 2 or 3, wherein the conditional PSCell configuration includes the one or more execution conditions.

Aspect 5: The method of any of aspects 2 through 4, wherein the conditional PSCell configuration is received via a radio resource control (RRC) reconfiguration message.

Aspect 6: The method of any of aspects 1 through 5, wherein the source master node indicates to a target secondary node associated with the selected target PSCell that a source SCG state corresponding to the source secondary node is in a deactivated state during the conditional execution procedure.

Aspect 7: The method of any of aspects 1 through 6, further comprising: performing, responsive to the source SCG state being an activated state, the random access channel (RACH) procedure on the selected target PSCell.

Aspect 8: The method of any of aspects 1 through 7, further comprising: transmitting, to the source master node, an radio resource control (RRC) reconfiguration complete message to indicate the selected target PSCell when the conditional execution procedure is initiated.

Aspect 9: The method of any of aspects 1 through 8, wherein the SCG state at the UE is set to the activated state and the RACH procedure is performed on the selected target PSCell in conjunction with the conditional execution procedure, and wherein the method further comprises: receiving, from the source master node or the target secondary node corresponding to the selected target PSCell, a correction indication to correct the SCG state at the UE after connecting to the selected target PSCell; and changing the SCG state at the UE to the deactivated state based on the correction indication.

Aspect 10: A user equipment (UE) comprising: a transceiver configured to communicate with a radio access network, a memory, and a processor communicatively coupled to the transceiver and the memory, wherein the processor and the memory are configured to perform any one of aspects 1 through 9.

Aspect 11: A UE configured for wireless communication comprising at least one means for performing any one of aspects 1 through 9.

Aspect 12: A non-transitory processor-readable storage medium having instructions for a UE thereon, wherein the instructions, when executed by a processing circuit, cause the processing circuit to perform any one of aspects 1 through 9.

Aspect 13: A method of wireless communication by a network node, comprising: operating in a multi-radio dual connectivity (MR-DC) mode with connections established with a user equipment (UE) and a source secondary node; changing a source secondary cell group (SCG) state associated with a source primary SCG cell (PSCell) of the source secondary node based on at least one of a request from the UE to change the source SCG state or a network condition; determining that the changing of the source SCG state has occurred during an evaluation process by the UE, wherein the evaluation process comprises evaluation of one or more link qualities between the UE and one or more target PSCells respectively associated with one or more target secondary nodes to select a target PSCell from the one or more target PSCells; and refraining from notifying the one or more target secondary nodes that the changing of the source SCG state has occurred during the evaluation process.

Aspect 14: The method of aspect 13, wherein the notification to the one or more target secondary nodes is a part of a conditional PSCell addition or a conditional PSCell change configuration modification procedure indicating the changing of the source SCG state to the one or more target secondary nodes.

Aspect 15: The method of aspect 13 or 14, wherein a respective SCG state of each of the one or more target PSCells of the one or more target secondary nodes is pre-set to an activated state as a default setting.

Aspect 16: The method of any of aspects 13 through 15, further comprising: transmitting, to the UE, a conditional PSCell addition or a conditional PSCell change configuration indicating the one or more target PScells, wherein the evaluation process is performed on the one or more target PScells indicated in the conditional PSCell addition or the conditional PSCell change configuration.

Aspect 17: The method of any of aspects 13 through 16, further comprising: transmitting, to the UE, an SCG change indication indicating that the source SCG state has changed.

Aspect 18: The method of any of aspects 13 through 17, further comprising: receiving, from the UE, a time elapsed between a past UE reception of conditional PSCell configurations and a past UE execution of at least one of a conditional PSCell addition or a conditional PSCell change; and transmitting, to the one or more target secondary nodes, at least one of the time elapsed or a traffic pattern of data radio bearers (DRBs) utilizing SCG resources, wherein one or more SCG states respectively for one or more target PSCells of the one or more target secondary node are configured based on the at least one of the time elapsed or the traffic pattern of the DRBs.

Aspect 19: A network node comprising: a transceiver configured to communicate with a radio access network, a memory, and a processor communicatively coupled to the transceiver and the memory, wherein the processor and the memory are configured to perform any one of aspects 13 through 18.

Aspect 20: A network node configured for wireless communication comprising at least one means for performing any one of aspects 13 through 18.

Aspect 21: A non-transitory processor-readable storage medium having instructions for a network node thereon, wherein the instructions, when executed by a processing circuit, cause the processing circuit to perform any one of aspects 13 through 18.

Aspect 22: A method of wireless communication by a network node, comprising: operating in a multi-radio dual connectivity (MR-DC) mode with connections established with a user equipment (UE) and a source secondary node; changing a source secondary cell group (SCG) state associated with a source primary SCG cell (PSCell) of the source secondary node based on at least one of a request from the UE to change the source SCG state or a network condition; determining that the changing of the source SCG state has occurred during an evaluation process by the UE, the evaluation process comprising evaluation of one or more link qualities between the UE and one or more target PSCells respectively associated with one or more target secondary nodes to select a target PScell from the one or more target PSCells; and initiating a conditional PSCell addition or a conditional PSCell change configuration modification procedure with the one or more target secondary nodes in response to determining that the changing of the source SCG state has occurred during the evaluation process, wherein the conditional PSCell addition or a conditional PSCell change configuration modification procedure comprises communicating the changed source SCG state to the one or more target secondary nodes.

Aspect 23: The method of aspect 22, further comprising: receiving, from the one or more target secondary nodes, one or more updated SCG configurations respectively corresponding to the one or more target PSCells, the one or more updated SCG configurations including one or more updated SCG states corresponding to the one or more target PSCells, respectively; and transmitting, to the UE, the one or more updated SCG configurations.

Aspect 24: The method of aspect 23, wherein the one or more updated SCG configurations are transmitted to the UE via a radio resource control (RRC) reconfiguration message.

Aspect 25: The method of any of aspects 22 through 24, further comprising: receiving, from the UE, a time elapsed between a past UE reception of conditional PSCell configurations and a past UE execution of at least one of a conditional PSCell addition or a conditional PSCell change; and transmitting, to the one or more target secondary nodes, at least one of the time elapsed or a traffic pattern of data radio bearers (DRBs) utilizing SCG resources, wherein one or more SCG states respectively for one or more target PSCells of the one or more target secondary node are configured based on the at least one of the time elapsed or the traffic pattern of the DRBs.

Aspect 26: A network node comprising: a transceiver configured to communicate with a radio access network, a memory, and a processor communicatively coupled to the transceiver and the memory, wherein the processor and the memory are configured to perform any one of aspects 13 through 18.

Aspect 27: A network node configured for wireless communication comprising at least one means for performing any one of aspects 13 through 18.

Aspect 28: A non-transitory processor-readable storage medium having instructions for a network node thereon, wherein the instructions, when executed by a processing circuit, cause the processing circuit to perform any one of aspects 13 through 18.

Aspect 29: A method of wireless communication by a network node, comprising: communicating with a source master node of a user equipment (UE) during a preparation procedure to determine that the network node is a target secondary node for potential connection to the UE to operate in a multi-radio dual connectivity (MR-DC) mode; receiving, during the preparation procedure, at least one of: a time elapsed between a past UE reception of conditional primary secondary cell (PSCell) configurations and a past UE execution of at least one of a conditional PSCell addition or a conditional PSCell change, or a traffic pattern of data radio bearers (DRBs) utilizing SCG resources; and determining an SCG state for a PSCell of the network node based on the at least one of the time elapsed or the traffic pattern of the DRBs. Aspect 30: The method of aspect 29, further comprising: transmitting the SCG state of the network node to the source master node configured to forward the SCG state of the network node to the UE.

Aspect 31: A network node comprising: a transceiver configured to communicate with a radio access network, a memory, and a processor communicatively coupled to the transceiver and the memory, wherein the processor and the memory are configured to perform any one of aspects 29 through 30.

Aspect 32: A network node configured for wireless communication comprising at least one means for performing any one of aspects 29 through 30.

Aspect 33: A non-transitory processor-readable storage medium having instructions for a network node thereon, wherein the instructions, when executed by a processing circuit, cause the processing circuit to perform any one of aspects 29 through 30.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-12 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-12 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method of wireless communication by a user equipment (UE), comprising:

operating in a multi-radio dual connectivity (MR-DC) mode with connections established to a source master node and a source secondary node;

evaluating one or more link qualities between the UE and one or more target primary secondary cell group (SCG) cells (PSCells) respectively associated with one or more target secondary nodes;

selecting a target PSCell from the one or more target PSCells based on the one or more link qualities and one or more execution conditions respectively associated with the one or more target PSCells of the one or more target secondary nodes;

initiating a conditional execution procedure to connect to a target secondary node corresponding to the selected target PSCell; and responsive to a source SCG state corresponding to a source PSCell of the source secondary node being a deactivated state, performing either:

(a) changing an SCG state at the UE to an activated state and performing a random access channel (RACH) procedure on the selected target PSCell to perform the conditional execution procedure to connect to the selected target PSCell, or (b) maintaining the SCG state at the UE as the deactivated state without performing a RACH procedure on the selected target PSCell.

2. The method of claim 1, further comprising:

receiving, from the source master node, a conditional PSCell configuration indicating the one or more target PSCells, wherein the evaluating the one or more link qualities is performed on the one or more target PSCells indicated in the conditional PSCell configuration.

3. The method of claim 2, wherein the conditional PSCell configuration includes a conditional PSCell addition or a conditional PSCell change configuration.

4. The method of claim 2, wherein the conditional PSCell configuration includes the one or more execution conditions.

5. The method of claim 2, wherein the conditional PSCell configuration is received via a radio resource control (RRC) reconfiguration message.

6. The method of claim 1, wherein the source master node indicates to a target secondary node associated with the selected target PSCell that a source SCG state corresponding to the source secondary node is in a deactivated state during the conditional execution procedure.

7. The method of claim 1, further comprising:

performing, responsive to the source SCG state being an activated state, the random access channel (RACH) procedure on the selected target PSCell.

8. The method of claim 1, further comprising:

transmitting, to the source master node, an radio resource control (RRC) reconfiguration complete message to indicate the selected target PSCell when the conditional execution procedure is initiated.

9. The method of claim 1, wherein the SCG state at the UE is set to the activated state and the RACH procedure is performed on the selected target PSCell in conjunction with the conditional execution procedure, and wherein the method further comprises:

receiving, from the source master node or the target secondary node corresponding to the selected target PSCell, a correction indication to correct the SCG state at the UE after connecting to the selected target PSCell; and changing the SCG state at the UE to the deactivated state based on the correction indication.

10. A user equipment (UE) for wireless communication, comprising:

at least one processor;

a transceiver communicatively coupled to the at least one processor; and a memory communicatively coupled to the at least one processor, wherein the at least one processor is configured to:

operate in a multi-radio dual connectivity (MR-DC) mode with connections established to a source master node and a source secondary node;

evaluate one or more link qualities between the UE and one or more target primary secondary cell group (SCG) cells (PSCells) respectively associated with one or more target secondary nodes;

select a target PSCell from the one or more target PSCells based on the one or more link qualities and one or more execution conditions respectively associated with the one or more target PSCells of the one or more target secondary nodes;

initiate a conditional execution procedure to connect to a target secondary node corresponding to the selected target PSCell; and responsive to a source SCG state corresponding to a source PSCell of the source secondary node being a deactivated state, perform either of:

(a) changing an SCG state at the UE to an activated state and performing a random access channel (RACH) procedure on the selected target PSCell to perform the conditional execution procedure to connect to the selected target PSCell, or (b) maintaining the SCG state at the UE as the deactivated state without performing a RACH procedure on the selected target PSCell.

11. The UE of claim 10, wherein the at least one processor is configured to:

receive, from the source master node, a conditional PSCell configuration indicating the one or more target PSCells, wherein the at least one processor configured to evaluate the one or more link qualities is configured to evaluate the one or more link qualities on the one or more target PSCells indicated in the conditional PSCell configuration.

12. The UE of claim 11, wherein the conditional PSCell configuration includes a conditional PSCell addition or a conditional PSCell change configuration.

13. The UE of claim 11, wherein the conditional PSCell configuration includes the one or more execution conditions.

14. The UE of claim 11, wherein the conditional PSCell configuration is received via a radio resource control (RRC) reconfiguration message.

15. The UE of claim 10, wherein the source master node indicates to a target secondary node associated with the selected target PSCell that a source SCG state corresponding to the source secondary node is in a deactivated state during the conditional execution procedure.

16. The UE of claim 10, wherein the at least one processor is configured to:

perform, responsive to the source SCG state being an activated state, the random access channel (RACH) procedure on the selected target PSCell.

17. The UE of claim 10, wherein the at least one processor is configured to:

transmit, to the source master node, an radio resource control (RRC) reconfiguration complete message to indicate the selected target PSCell when the conditional execution procedure is initiated.

18. The UE of claim 10, wherein the SCG state at the UE is set to the activated state and the RACH procedure is performed on the selected target PSCell in conjunction with the conditional execution procedure, and wherein the at least one processor is configured to:

receive, from the source master node or the target secondary node corresponding to the selected target PSCell, a correction indication to correct the SCG state at the UE after connecting to the selected target PSCell; and change the SCG state at the UE to the deactivated state based on the correction indication.

* * * * *